United States Patent
Hada et al.

(10) Patent No.: US 10,066,730 B2
(45) Date of Patent: Sep. 4, 2018

(54) GEARBOX AND METHOD FOR ASSEMBLING SAME

(71) Applicants: Aichi Machine Industry Co., Ltd., Nagoya-shi, Aichi (JP); ATSUMITEC CO., LTD., Hamamatsu-shi, Shizuoka (JP)

(72) Inventors: Masatoshi Hada, Nagoya (JP); Hirofumi Takai, Nagoya (JP); Akio Muto, Nagoya (JP); Toshihiro Nakajima, Nagoya (JP); Yuji Hijiriyama, Nagoya (JP); Kenji Matsuda, Hamamatsu (JP); Kazufumi Hosoda, Hamamatsu (JP)

(73) Assignees: Aichi Machine Industry, Co., Ltd., Nagoya (JP); Atsumitec Co., Ltd., Hamamatsu (JP)

( * ) Notice: Subject to any disclaimer, the term of this patent is extended or adjusted under 35 U.S.C. 154(b) by 46 days.

(21) Appl. No.: 15/512,800

(22) PCT Filed: Sep. 25, 2015

(86) PCT No.: PCT/JP2015/077083
§ 371 (c)(1),
(2) Date: Mar. 20, 2017

(87) PCT Pub. No.: WO2016/052324
PCT Pub. Date: Apr. 7, 2016

(65) Prior Publication Data
US 2017/0292600 A1    Oct. 12, 2017

(30) Foreign Application Priority Data

Sep. 29, 2014   (JP) .................................. 2014-198940

(51) Int. Cl.
*F16H 57/023* (2012.01)
*F16H 63/30* (2006.01)
(Continued)

(52) U.S. Cl.
CPC ........... *F16H 57/023* (2013.01); *F16H 57/02* (2013.01); *F16H 57/031* (2013.01); *F16H 63/30* (2013.01);
(Continued)

(58) Field of Classification Search
CPC ...... F16H 57/023; F16H 57/031; F16H 63/30; F16H 2057/005; F16H 2057/02043; F16H 2063/3083
See application file for complete search history.

(56) References Cited

U.S. PATENT DOCUMENTS 4,484,488 A * 11/1984 Kato ......................... F16H 3/14
                                                                  74/359
4,716,775 A *  1/1988 Horii ....................... F16H 3/085
                                                                 74/15.4
(Continued)

FOREIGN PATENT DOCUMENTS

FR           3000777 A1    7/2014
JP        2005265136 A     9/2005
(Continued)

OTHER PUBLICATIONS

International Search Report in PCT/JP2015/077083 dated Dec. 15, 2015.

*Primary Examiner* — Drew J Brown

(57) ABSTRACT

A transmission includes a fork mechanism in which a plurality of fork rods to which a plurality of shift forks are connected are each attached to a pedestal so as to be moveable in an axial direction. An assembly guide portion is disposed on the pedestal and a guide pin is erected on a
(Continued)

clutch housing. As a result, even in cases where an input shaft and a main shaft, on which driving and driven gears and synchro devices are assembled, are assembled on the clutch housing in a state that the driving and driven gears are engaged and, thereafter the fork mechanism is assembled on this clutch housing, the assembly of the fork mechanism on the clutch housing can be easily performed.

19 Claims, 22 Drawing Sheets

(51) Int. Cl.
  *F16H 57/02* (2012.01)
  *F16H 57/031* (2012.01)
  *F16H 63/32* (2006.01)
  *F16H 57/00* (2012.01)

(52) U.S. Cl.
  CPC ....... *F16H 63/32* (2013.01); *F16H 2057/005* (2013.01); *F16H 2057/02043* (2013.01); *F16H 2063/3083* (2013.01); *H05K 999/99* (2013.01)

(56) References Cited

U.S. PATENT DOCUMENTS

| | | | | |
|---|---|---|---|---|
| 5,339,703 A | * | 8/1994 | Tanaka | B60K 17/28 192/3.62 |
| 5,465,630 A | * | 11/1995 | Iwamoto | B60K 17/04 74/331 |
| 5,570,605 A | * | 11/1996 | Kitagawara | F16H 37/043 74/15.63 |
| 6,119,552 A | * | 9/2000 | Matsufuji | F16H 3/091 74/15.66 |
| 6,397,693 B1 | * | 6/2002 | Umemoto | F16H 3/0915 74/333 |
| 7,434,488 B2 | * | 10/2008 | Tsuji | F16H 63/30 74/329 |
| 9,032,822 B2 | * | 5/2015 | Tsuji | F16H 37/043 74/11 |
| 2002/0042852 A1 | * | 4/2002 | Umemoto | F16H 3/0915 710/1 |
| 2006/0243076 A1 | | 11/2006 | Tsuji et al. | |
| 2006/0243513 A1 | * | 11/2006 | Tsuji | B60K 17/28 180/252 |
| 2009/0100952 A1 | * | 4/2009 | Tsuji | B60K 17/08 74/335 |

FOREIGN PATENT DOCUMENTS

| | | |
|---|---|---|
| JP | 2006183739 A | 7/2006 |
| JP | 4437447 B2 | 3/2010 |
| JP | 2010190289 A | 9/2010 |
| JP | 2011256962 A | 12/2011 |

* cited by examiner

GEARBOX AND METHOD FOR ASSEMBLING SAME

CROSS-REFERENCE TO RELATED APPLICATIONS

This application is a national stage application of PCT/JP2015/077083, which claims priority to Japanese Patent Application No. JP 2014-198940, filed in the Japan Patent Office on Sep. 29, 2014, the contents of each of which are hereby incorporated herein by reference.

BACKGROUND

Technical Field

The present invention relates to a transmission provided with a case member, a gear module, and a fork module.

Background Art

Japanese Patent No. 4437447B recites a transmission including: a transmission case; an input shaft, an output shaft, and a countershaft supported by the transmission case; first to sixth-speed gear trains for transmitting drive power from the input shaft to the output shaft via the countershaft; a plurality of synchromesh mechanisms for switching from the first to the sixth-speed gear trains; a plurality of shift forks that respectively engage with sleeves of the plurality of synchromesh mechanisms; fork rods support each of the plurality of shift forks; and a cover for closing an opening formed in the transmission case.

With this transmission, the first to sixth-speed gear trains, and the input shaft, the output shaft, and the countershaft on which the synchromesh mechanisms have been arranged are pre-assembled in the transmission case, and the shift forks and the fork rods are pre-assembled in the cover. As such, the shift forks can be matched and engaged with the sleeves of the synchromesh mechanisms by simply attaching the cover to the transmission case to close the opening. As a result, the ease of assembly of the transmission is improved.

SUMMARY

However, with the transmission described above, when engaging the shift forks with the sleeves of the synchromesh mechanisms, the cover gets in the way and it is not possible to see the components while engaging the components. As such, there is room for improvement with regards to ease of assembly.

In light of the foregoing, an object of the present invention is to provide technology that contributes to an improvement in the ease of assembly of transmissions.

A transmission and a method for assembling the same of the present invention employ the following means to achieve the object described above.

According to a preferable embodiment of the transmission according to the present invention, a transmission has a configuration including a case member, a gear module, a fork module, and a guide mechanism. The gear module includes: a first shaft supported by the case member; a second shaft supported by the case member so as to be parallel with the first shaft; a first idler gear supported by the first shaft so as to be relatively rotatable with respect to the first shaft; a first fixed gear fixed to the second shaft so as to engage with the first idler gear; a second idler gear supported by the second shaft so as to be relatively rotatable with respect to the second shaft; a second fixed gear fixed to the first shaft so as to engage with the second idler gear; a first fixing member disposed on the first shaft and configured to perform fixing the first idler gear to the first shaft and releasing the first idler gear from the first shaft; and a second fixing member disposed on the second shaft and configured to perform fixing the second idler gear to the second shaft and releasing the second idler gear from the second shaft. Additionally, the fork module includes: a first shift fork configured to engage with the first fixing member; a first fork shaft supporting the first shift fork; a second shift fork configured to engage with the second fixing member; a second fork shaft supporting the second shift fork; and a supporting member supporting the first fork shaft and the second fork shaft so as to be movable in an axial direction. Moreover, the guide mechanism is configured to guide the fork module such that, when assembling the fork module to the case member to which the gear module has been assembled, the engaging of the second shift fork with the second fixing member is started after the engaging of the first shift fork with the first fixing member has started.

For example, according to the present invention, in cases where the components cannot be seen when engaging the first and second shift forks with the first and second fixing members or, alternatively, in cases where an inexperienced worker performs the assembling or the like, the engaging of the first and second shift forks with the first and second fixing members can be easily performed. As a result, the ease of assembly of the fork module on the case member can be improved.

According to another embodiment of the transmission according to the present invention, the guide mechanism guides the fork module such that the second shift fork engages with the second fixing member after guiding the fork module such that the first shift fork engages with the first fixing member.

According to this embodiment, the engaging direction of the first shift fork with the first fixing member and the engaging direction of the second shift fork with the second fixing member are configured to be different and, even in cases where the first and second shift forks cannot be simultaneously engaged with the first and second fixing members, the fork module can be assembled in the case member while guiding by the guide mechanism. As a result, the first and second shift forks can be easily engaged with the first and second fixing members.

According to another embodiment of the transmission according to the present invention, the guide mechanism is configured to engage the second shift fork with the second fixing member by rotating the fork module about an axial center of the first shaft.

According to this embodiment, the second shift fork can be engaged with the second fixing member using a simple configuration, namely, by rotating the fork module about the axial center of the first shaft.

According to another embodiment of the transmission according to the present invention, the guide mechanism includes: a pin member disposed in one of the case member and the supporting member; and a guide groove disposed in another of the case member and the supporting member, with which the pin member is engageable.

According to this embodiment, the guide mechanism can be easily obtained because the configuration simply includes engaging the pin member with the guide groove.

According to another embodiment of the transmission according to the present invention, the transmission further includes a plurality of bolts configured to fix the supporting member to the case member. One of the plurality of bolts is configured as a positioning bolt capable of restricting relative positions between the supporting member and the case member. Moreover, the supporting member is configured to be positioned with respect to the case member by the positioning bolt and the engaging of the pin member with the guide groove.

According to this embodiment, a dedicated component for positioning the supporting member in the case member is not needed and, therefore, the positioning of the supporting member with the case member can be performed while suppressing increases in the number of components.

According to another embodiment of the transmission according to the present invention of the embodiment in which the guide mechanism includes the pin member and the guide groove, the guide groove is configured to have a shape along an imaginary arc with the axial center of the first shaft as a center and a radius of a size equal to the sum of a radius of the pin member and a distance from the axial center to a center of the pin member. In the present invention, the phrase "shape along an imaginary arc" preferably includes shapes that have a curvature roughly the same as the imaginary arc in addition to shapes that have a curvature identical to the imaginary arc.

According to this embodiment, a configuration in which the fork module is rotated about the axial center of the first shaft can be easily obtained.

According to another embodiment of the transmission according to the present invention, the guide mechanism is configured such that the engaging of the first shift fork with the first fixing member is started when the pin member and the guide groove assume a first state; the engaging of the second shift fork with the second fixing member is started together with completing of the engaging of the first shift fork with the first fixing member, when the pin member and the guide groove assume a second state; and the engaging of the second shift fork with the second fixing member is finished when the pin member and the guide groove assume a third state.

According to this embodiment, the engaging of the first and second shift forks with the first and second fixing members can be more reliably and easily performed.

According to another embodiment of the transmission according to the present invention, the gear module further includes: a third idler gear supported by the first shaft so as to be relatively rotatable with respect to the first shaft; a third fixed gear fixed to the second shaft so as to engage with the third idler gear; and a third fixing member disposed on the first shaft and configured to perform fixing the third idler gear to the first shaft and releasing the third idler gear from the first shaft. Additionally, the fork module further includes: a third shift fork configured to engage with the third fixing member; and a third fork shaft supporting the third shift fork. Moreover, the fork module is configured such that the engaging of the third shift fork with the third fixing member is started at substantially the same timing as a timing at which the engaging of the first shift fork with the first fixing member is started.

According to this embodiment, the engaging of the third shift fork with the third fixing member and the engaging of the first shift fork with the first fixing member can be performed at substantially the same timing. As a result, even in cases where the fork module includes three fork shafts, the fork module can be easily assembled.

According to another embodiment of the transmission according to the present invention, the third shift fork is configured such that the engaging with the third fixing member is started at the first state, and the engaging with the third fixing member is completed at the second state.

According to this embodiment, the engaging of the third shift fork with the third fixing member and the engaging of the first shift fork with the first fixing member can be performed at exactly the same timing. As a result, even in cases where the fork module includes three fork shafts, the fork module can be easily assembled.

According to another embodiment of the transmission according to the present invention, the supporting member further includes a restricting portion that restricts pivoting of the first, the second, and the third fork shafts.

According to this embodiment, pivoting of the first, the second, and the third fork shafts can be restricted and, therefore, the occurrence of shift operation failures can be excellently prevented.

According to another embodiment of the transmission according to the present invention, the transmission further includes a shift lever that operates in accordance with shifting operations of an operator. Additionally, first, second, and third arm parts include grooves engageable with the shift lever are fixed to the first, second, and third fork shafts. Furthermore, the first, second, and third arm parts are disposed adjacent to each other such that the grooves are matched and a single groove extending in a direction orthogonal to an axial direction of the first, second, and third fork shafts is formed. Moreover, the restricting portion includes a pair of wall portions erected integrally with the supporting member so as to face the arm parts, among the first, second, and third arm parts, that are disposed on both ends in the extending direction of the single groove.

In the present invention, the term "disposed adjacently" preferably includes aspects in which a portion of the first, second, and third arm parts, specifically only the portion in the first, second, and third arm parts where the grooves are formed, are disposed adjacent to each other.

According to this embodiment, the configuration simply includes integrally erecting the pair of wall portions with the supporting member so as to sandwich the first, second, and third arm parts. Therefore, the configuration, in which the pivoting of the first, second, and third fork shafts can be restricted, can be easily obtained.

According to another embodiment of the transmission according to the present invention, the gear module further includes: a fourth idler gear supported by the second shaft so as to be relatively rotatable with respect to the second shaft; a fourth fixed gear fixed to the first shaft so as to engage with the fourth idler gear; and a fourth fixing member disposed on the second shaft and configured to perform fixing the fourth idler gear to the second shaft and releasing the fourth idler gear from the second shaft. Additionally, the fork module further includes: a fourth shift fork configured to engage with the fourth fixing member; and a fourth fork shaft supporting the fourth shift fork. Moreover, the fourth shift fork is configured such that the engaging with the fourth fixing member is started at the second state, and the engaging with the fourth fixing member is completed at the third state.

According to this embodiment, the engaging of the fourth shift fork with the fourth fixing member and the engaging of the second shift fork with the second fixing member can be performed at the same timing. As a result, even in cases where the fork module includes three or four fork shafts, the fork module can be easily assembled.

According to another embodiment of the transmission according to the present invention, the first and second fixing members are configured to be activated via the first and second shift forks due to the first and second fork shafts moving in the axial direction. Moreover, the supporting member is configured to be capable of positioning axial direction positions of the first and second fork shafts such that the fixing of the first and second idler gears to the first and second shafts by the first and second fixing members is maintained, and also is configured to be capable of positioning axial direction positions of the first and second fork shafts such that the releasing of the first and second idler gears from the first and second shafts by the first and second fixing members is maintained.

According to this embodiment, the supporting member includes a so-called shift check mechanism and, therefore, it is not necessary to separately secure space for providing a shift check mechanism.

According to another embodiment of the transmission according to the present invention, the supporting member includes first and second boss portions for supporting the first and second fork shafts. Moreover, at least one of the first and second boss portions is configured to restrict axial direction movement to the first and/or second boss portion side of the first and/or second shift fork accompanying axial direction movement of the first and/or second fork shaft.

According to this embodiment, a configuration is provided in which the axial direction movement of the first shift fork and/or the second shift fork is restricted using the first boss portion and/or the second boss portion. Therefore, a stopper structure for restricting the axial direction movement of the shift forks can be easily obtained and, as it is not necessary to provide a dedicated component, increases in the number of components can be suppressed.

According to another embodiment of the transmission according to the present invention, the third fixing member is configured to be activated via the third shift fork due to the third fork shaft moving in the axial direction. Moreover, the supporting member is configured to be capable of positioning an axial direction position of the third fork shaft such that the fixing of the third idler gear to the first shaft by the third fixing member is maintained, and also is configured to be capable of positioning an axial direction position of the third fork shaft such that the releasing of the third idler gear from the first shaft by the third fixing member is maintained.

According to this embodiment, the supporting member includes a so-called shift check mechanism and, therefore, it is not necessary to separately secure space for providing a shift check mechanism.

According to another embodiment of the transmission according to the present invention, the fourth fixing member is configured to be activated via the fourth shift fork due to the fourth fork shaft moving in the axial direction. Moreover, the supporting member is configured to be capable of positioning an axial direction position of the fourth fork shaft such that the fixing of the fourth idler gear to the second shaft by the fourth fixing member is maintained, and also is configured to be capable of positioning an axial direction position of the fourth fork shaft such that the releasing of the fourth idler gear from the second shaft by the fourth fixing member is maintained.

According to this embodiment, the supporting member includes a so-called shift check mechanism and, therefore, it is not necessary to separately secure space for a shift check mechanism.

According to another embodiment of the transmission according to the present invention, the case member includes: a housing to which the first shaft, the second shaft, and the supporting member are attached; and a case body capable of housing the gear module and the fork module. Moreover, a body attachment face of the housing to which the case body is attached and a supporting member attachment face of the housing to which the supporting member is attached are configured to be flush.

According to this embodiment, the supporting member can be caused to slide on the body attachment face in addition to on the supporting member attachment face. That is, a wide slideable range of the supporting member on the housing can be obtained and, therefore, the degree of freedom of guiding the fork module can be improved.

According to a preferable embodiment of a method for assembling a transmission according to the present invention, a transmission includes: a case member; a gear module; and a fork module. The case member includes: a housing configured such that the gear module and the fork module are attachable thereto; and a case main body configured to be capable of housing the gear module and the fork module. The gear module includes: a first shaft supported by the case member; a second shaft supported by the case member so as to be parallel with the first shaft; a first idler gear supported by the first shaft so as to be relatively rotatable with respect to the first shaft; a first fixed gear fixed to the second shaft so as to engage with the first idler gear; a second idler gear supported by the second shaft so as to be relatively rotatable with respect to the second shaft; a second fixed gear fixed to the first shaft so as to engage with the second idler gear; a first fixing member disposed on the first shaft and configured to fix the first idler gear to the first shaft and release the first idler gear from the first shaft; and a second fixing member disposed on the second shaft and configured to perform fixing the second idler gear to the second shaft and releasing the second idler gear from the second shaft. Additionally, the fork module includes: a first shift fork configured to engage the first fixing member; a first fork shaft supporting the first shift fork; a second shift fork configured to engage the second fixing member; a second fork shaft supporting the second shift fork; and a supporting member supporting the first fork shaft and the second fork shaft so as to be movable in an axial direction. Moreover, the method includes the steps of: assembling the gear module to the housing; assembling the fork module to the housing, to which the gear module has been assembled, by guiding the fork module such that the engaging of the second shift fork with the second fixing member is started after the engaging of the first shift fork with the first fixing member has been started; and assembling the case main body to the housing to which the gear module and the fork module have been assembled.

For example, according to the present invention, in cases where the components cannot be seen when engaging the first and second shift forks with the first and second fixing members or, alternatively, in cases where an inexperienced worker performs the assembling or the like, the engaging of the first and second shift forks with the first and second fixing members can be easily performed. As a result, the ease of assembly of the transmission, particularly the ease of assembly of the fork module on the case member can be improved.

According to another embodiment of the method for assembling a transmission according to the present invention, when guiding the fork module such that the engaging of the second shift fork with the second fixing member is started after the engaging of the first shift fork with the first fixing member has started, the fork module is guided such that the second shift fork engages the second fixing member after guiding the fork module such that the first shift fork engages the first fixing member.

According to this embodiment, the engaging direction of the first shift fork with the first fixing member and the engaging direction of the second shift fork with the second fixing member are configured to be different and, even in cases where the first and second shift forks cannot simultaneously engage the first and second fixing members, the fork module can be assembled to the case member while guiding by the guide mechanism. As a result, the first and second shift forks can easily engage the first and second fixing members.

According to the present invention, the ease of assembly of a transmission can be further improved.

BRIEF DESCRIPTION OF THE DRAWINGS

Referring now to the attached drawings which form a part of this original disclosure.

DETAILED DESCRIPTION OF EMBODIMENTS

Next, a preferred embodiment of the present invention will be described using embodiments.

Figure 1:
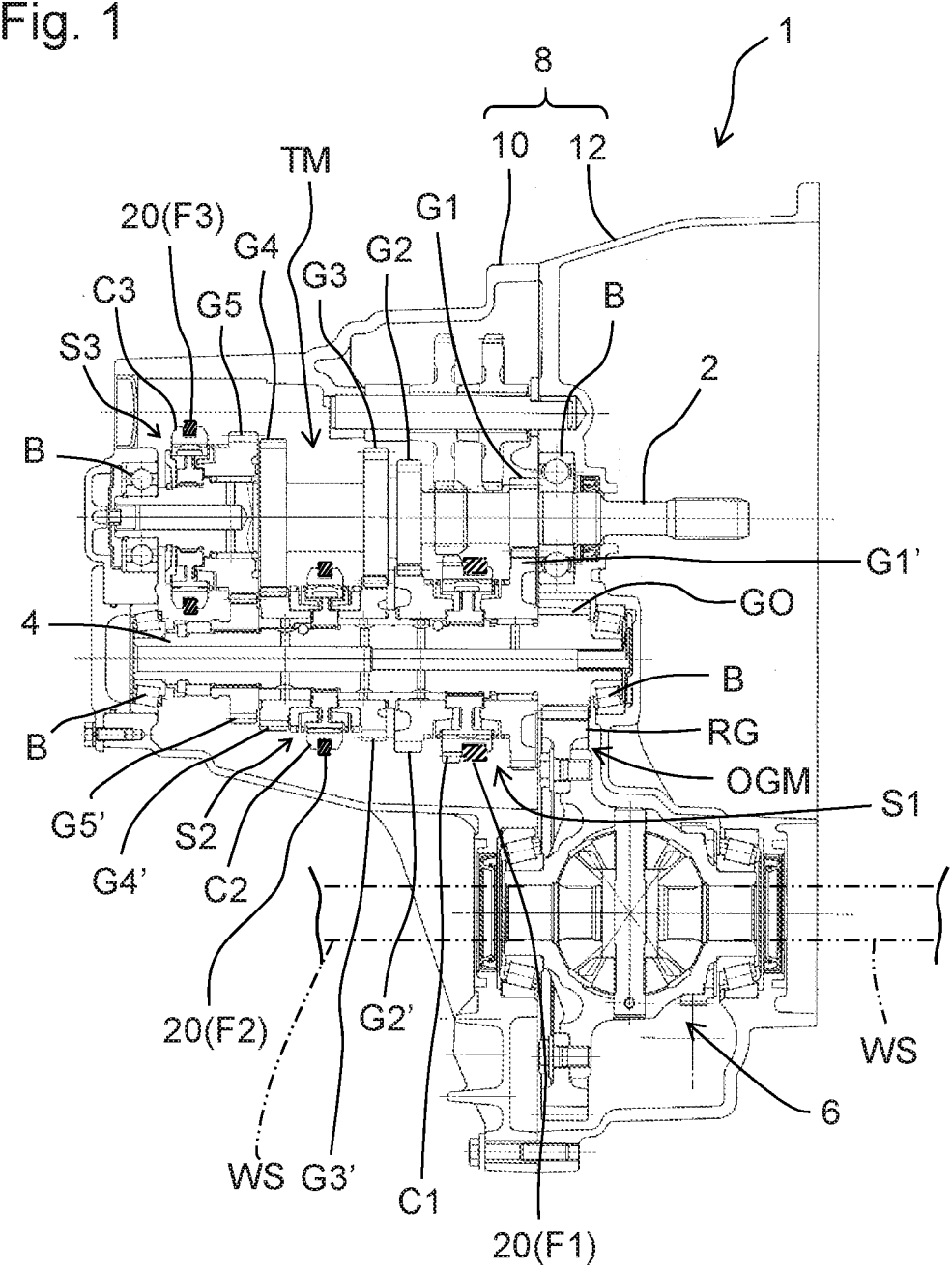
FIG. 1 is a schematic configuration drawing illustrating an overview of a configuration of a transmission 1 according to an embodiment of the present invention.

As illustrated in FIG. 1, a transmission 1 according to the present embodiment includes an input shaft 2, a main shaft 4 connected to the input shaft 2 via a transmission gear mechanism TM, a differential device 6 connected to the main shaft 4 via an output gear mechanism OGM, and a transmission case 8 housing these components. The transmission 1 is configured as a manual transmission for a so-called front engine/front drive (FF) vehicle to be mounted on an FF vehicle in which the engine is arranged transversely (in the transverse direction of the vehicle).

As illustrated in FIG. 1, the input shaft 2 is supported rotatably by the transmission case 8 via bearings B. A clutch (not illustrated) is attached to one end portion (the right side portion in FIG. 1) of the input shaft 2 by a spline fitting or the like. The input shaft 2 is configured such that a drive force from the engine (not illustrated) is input via the clutch (not illustrated). In this embodiment, an example of a configuration is provided in which the input shaft 2 corresponds to "the second shaft" in the present invention.

As illustrated in FIG. 1, the main shaft 4 is disposed parallel with the input shaft 2 and is supported rotatably by the transmission case 8 via the bearings B. An output gear GO is integrally formed on one end side (the right side in FIG. 1) of the main shaft 4. In this embodiment, an example of a configuration is provided in which the main shaft 4 corresponds to "the first shaft" in the present invention.

As illustrated in FIG. 1, the transmission gear mechanism TM includes: first to fourth-speed drive gears G1, G2, G3, and G4 that are fixedly disposed on the input shaft 2; a fifth-speed drive gear G5 disposed rotatably on the input shaft 2; first to fourth-speed driven gears G1', G2', G3', and G4' that are rotatably disposed on the main shaft 4 so as to engage with the first to fourth-speed drive gears G1, G2, G3, and G4; a fifth-speed driven gear G5' fixedly disposed on the main shaft 4 so as to engage with the fifth-speed drive gear G5; a first/second-speed synchro device Si and a third/fourth-speed synchro device S2 fixedly disposed on the main shaft 4; a fifth-speed synchro device S3 fixedly disposed on the input shaft 2; and a fork mechanism 20 connected to the synchro devices S1, S2, and S3.

In this embodiment, an example of a configuration is given in which the first and second-speed driven gears G1' and G2' correspond to "the first idler gear" in the present invention; the third and fourth-speed driven gears G3' and G4' correspond to "the third idler gear" in the present invention; and the fifth-speed drive gear G5 corresponds to "the second idler gear" in the present invention. In this embodiment, an example of a configuration is given in which the first and second-speed drive gears G1 and G2 correspond to "the first fixed gear" in the present invention; the third and fourth-speed drive gears G3 and G4 correspond to "the third fixed gear" in the present invention; and the fifth-speed driven gear G5' corresponds to "the second fixed gear" in the present invention.

While detailed description is omitted, the synchro devices S1, S2, and S3 are configured from synchronizer hubs (not illustrated), coupling sleeves C1, C2, and C3, synchronizer rings (not illustrated), and clutch gears (not illustrated).

The synchro devices S1 and S2 are configured to synchronize rotational speeds of the first to fourth-speed driven gears G1', G2', G3', and G4' with the main shaft 4. Additionally, the synchro device S3 is configured to synchronize rotational speed of the fifth-speed drive gear G5 with rotational speed of the input shaft 2. In this embodiment, an example of a configuration is given in which the synchro devices S1, S2, and S3 respectively correspond to "the first fixing member", "the third fixing member", and "the second fixing member" in the present invention.

As illustrated in FIGS. 2 to 5, the fork mechanism 20 includes shift forks F1, F2, and F3; fork rods FS1, FS2, and FS3 that support the shift forks F1, F2, and F3; and a pedestal 22 that supports one end of the fork rods FS1, FS2, and FS3. In this embodiment, an example of a configuration is given in which the fork mechanism 20 corresponds to "the fork module" in the present invention.

The shift forks F1, F2, and F3 include connecting portions F1a, F2a, and F3a that connect to the fork rods FS1, FS2, and FS3; and arm parts F1b, F2b, and F3b that protrude forked in arch shapes from the connecting portions F1a, F2a, and F3a. In this embodiment, an example of a configuration is given in which the shift forks F1, F2, and F3 respectively correspond to "the first shift fork", "the third shift fork", and "the second shift fork" in the present invention.

Figure 3:
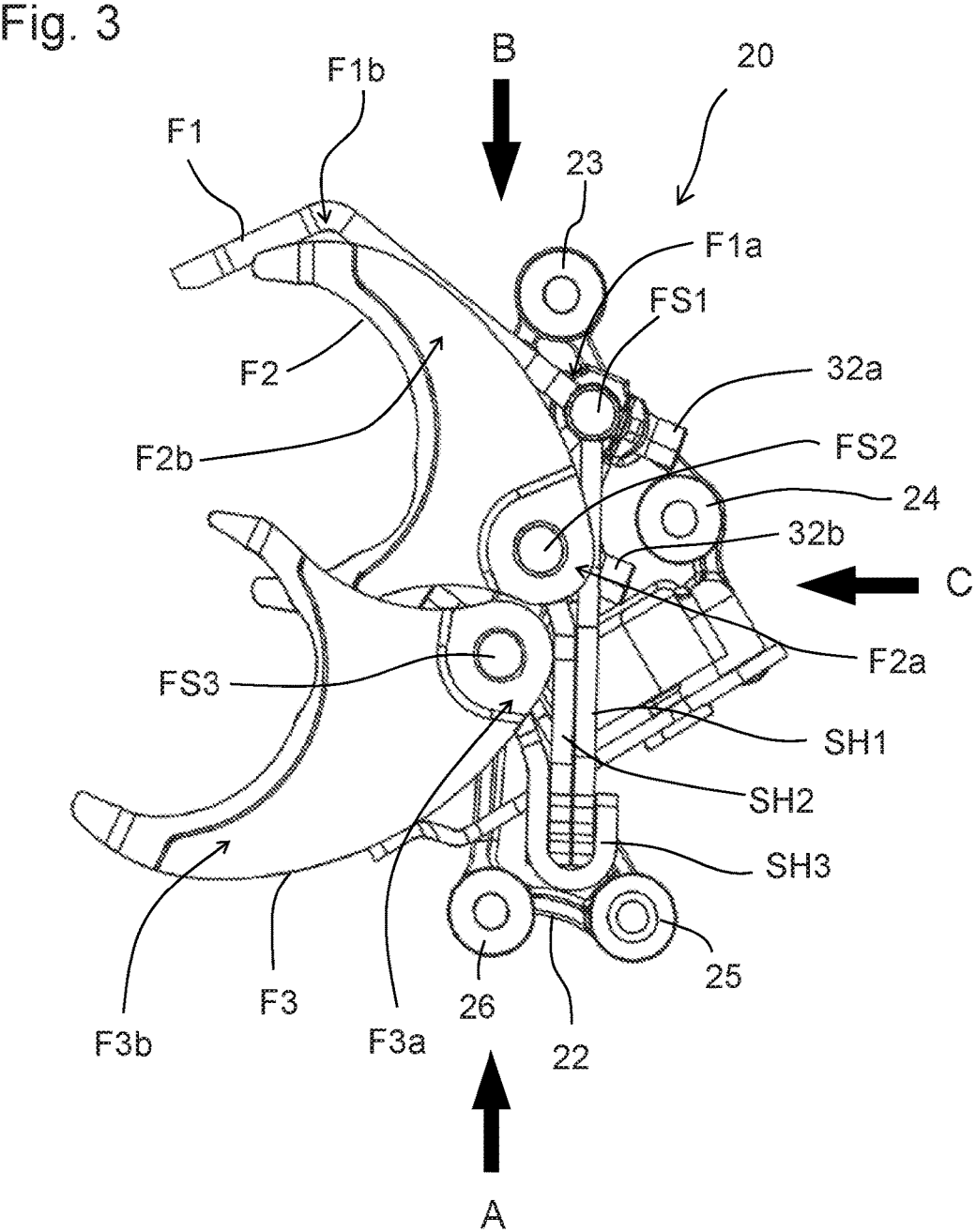
FIG. 3 is a plan view of the fork mechanism 20, viewed from an axial direction.

As illustrated in FIG. 3, the shift fork F1 and the shift fork F2 are connected to the fork rods FS1 and FS2 such that opening directions of arc inner circumferential faces of the arm part F1b and the arm part F2b are substantially the same direction. Note that, as illustrated in FIG. 1, the shift forks F1, F2, and F3 are engaged with the coupling sleeves C1, C2, and C3 of the synchro devices S1, S2, and S3.

Here, the phrase "the opening directions are substantially the same direction" is not limited to aspects where the opening directions of the arc inner circumferential faces of the shift forks F1 and F2 are configured in exactly the same direction, but also preferably includes aspects in which the opening directions of the arc inner circumferential faces of the shift forks F1 and F2 differ to a degree where the shift forks F1 and F2 can be simultaneously engaged with the coupling sleeves C1 and C2 when assembling the fork mechanism 20 (described later).

Figure 4:
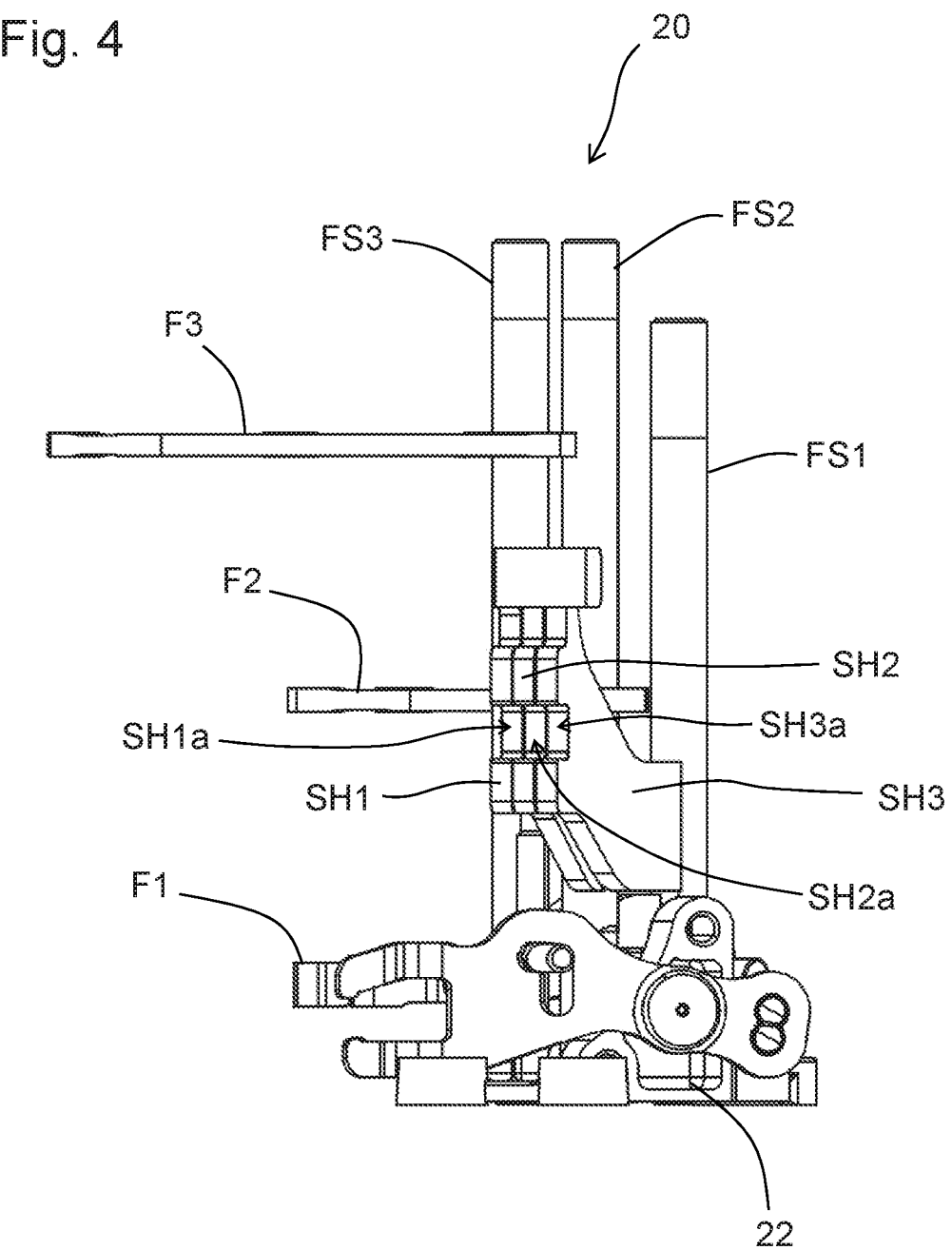
FIG. 4 is an elevational view, viewed in the direction of arrow A in FIG. 3.
Figure 5:
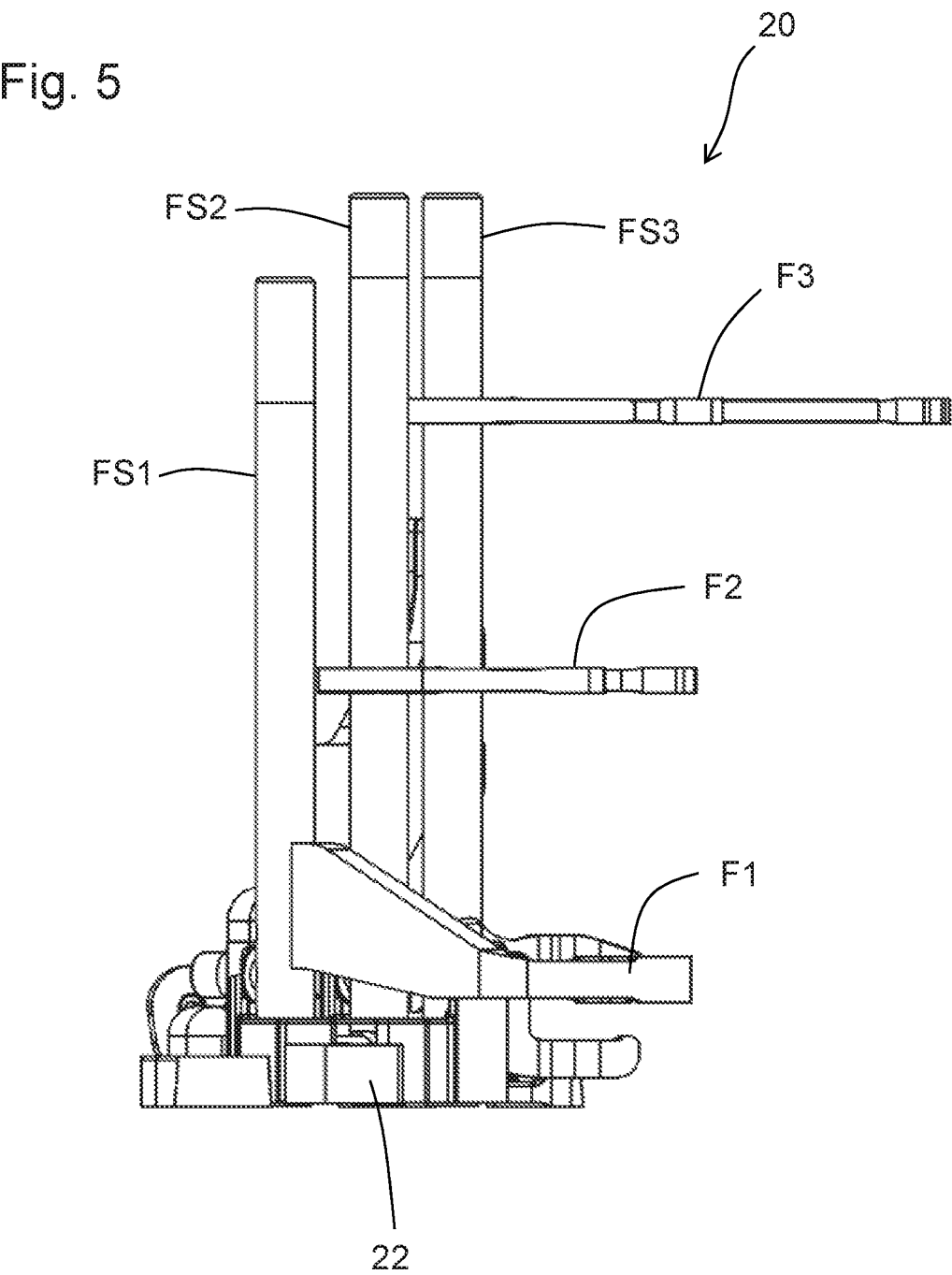
FIG. 5 is an elevational view, viewed in the direction of arrow B in FIG. 3.
Figure 6:
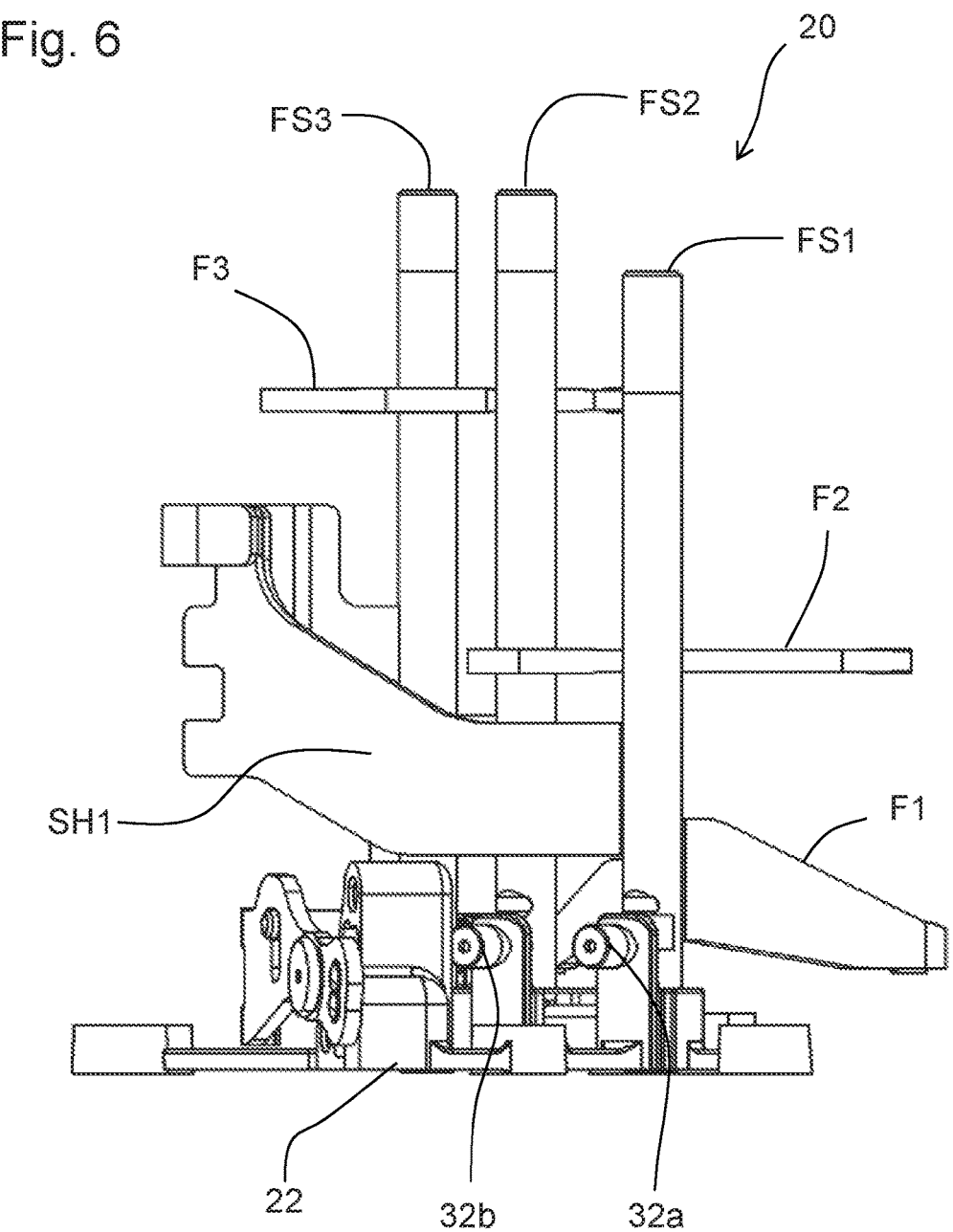
FIG. 6 is an elevational view, viewed in the direction of arrow C in FIG. 3.

As illustrated in FIG. 2 and FIGS. 4 to 6, one end side (the bottom side in FIG. 2 and FIGS. 4 to 6) of the fork rods FS1, FS2, and FS3 is supported by the pedestal 22 so as to be movable in the axial direction. As illustrated in FIG. 4, the fork rods FS1, FS2, and FS3 are formed integrally with the shift heads SH1, SH2, and SH3, respectively. In this embodiment, an example of a configuration is given in which the fork rods FS1, FS2, and FS3 respectively correspond to "the first fork shaft", "the third fork shaft", and "the second fork shaft" in the present invention. Additionally, in this embodiment, an example of a configuration is given in which the shift heads SH1, SH2, and SH3 respectively correspond to "the first arm part", "the third arm part", and "the second arm part" in the present invention.

As illustrated in FIG. 4, U-shaped grooves SH1a, SH2a, and SH3a are formed in one end portion (the end portion of the side opposite the side where the fork rods FS1, FS2, and FS3 are connected) of the shift heads SH1, SH2, and SH3. A shift lever SL (see FIG. 22) is engaged to the grooves SH1a, SH2a, and SH3a.

As illustrated in FIG. 4, the shift heads SH1, SH2, and SH3 are adjacently disposed in the order of the shift heads SH1, SH2, and SH3 such that the grooves SH1a, SH2a, and SH3a each match and a single groove extends in a direction (the horizontal direction in FIG. 4) orthogonal to the axial direction (the vertical direction in FIG. 4) of the fork rods FS1, FS2, and FS3.

That is, a change lever (not illustrated) is select operated and, as a result, the shift lever SL (see FIG. 22) pivots and engages with one of the grooves SH1a, SH2a, or SH3a. Then, the change lever (not illustrated) is shift operated and, as a result, the shift lever SL (see FIG. 22) moves in the axial direction of the fork rods FS1, FS2, and FS3, and the fork rod FS1, FS2, or FS3 move in the axial direction via the engaged shift head SH1, SH2, or SH3.

Figure 2:
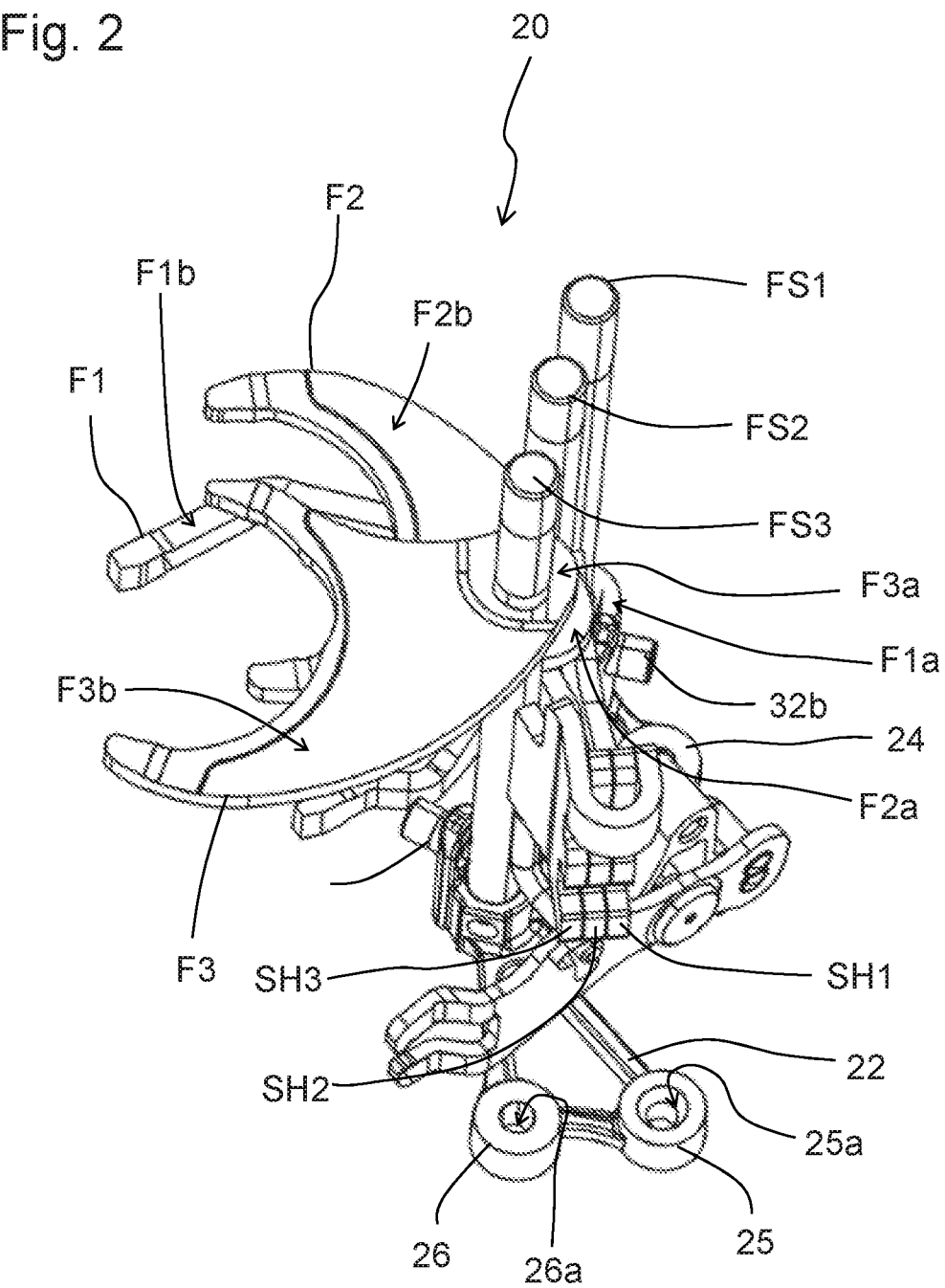
FIG. 2 is a perspective view illustrating an appearance of a fork mechanism 20.

Note that, as illustrated in FIGS. 2 and 3, the shift head SH3 includes a bent portion SH3' formed by bending a portion of the shift head SH3. Rocking of the shift heads SH1, SH2, and SH3 (pivoting of the fork rods FS1, FS2, and FS3) is restricted as a result of the shift heads SH1 and SH2 being sandwiched by the bent portion SH3'. As a result, the occurrence of engagement failures between the grooves SH1a, SH2a, and SH3a and the shift lever SL (see FIG. 22) are prevented.

The coupling sleeves C1, C2, and C3 are moved in the axial direction via the shift forks F1, F2, and F3 as a result of the fork rods FS1, FS2, and FS3 being moved in the axial direction, and a desired gear from among the first to fourth-speed driven gears G1', G2', G3', and G4' and the fifth drive gear G5 is fixed to the main shaft 4 or the input shaft 2.

Figure 7:
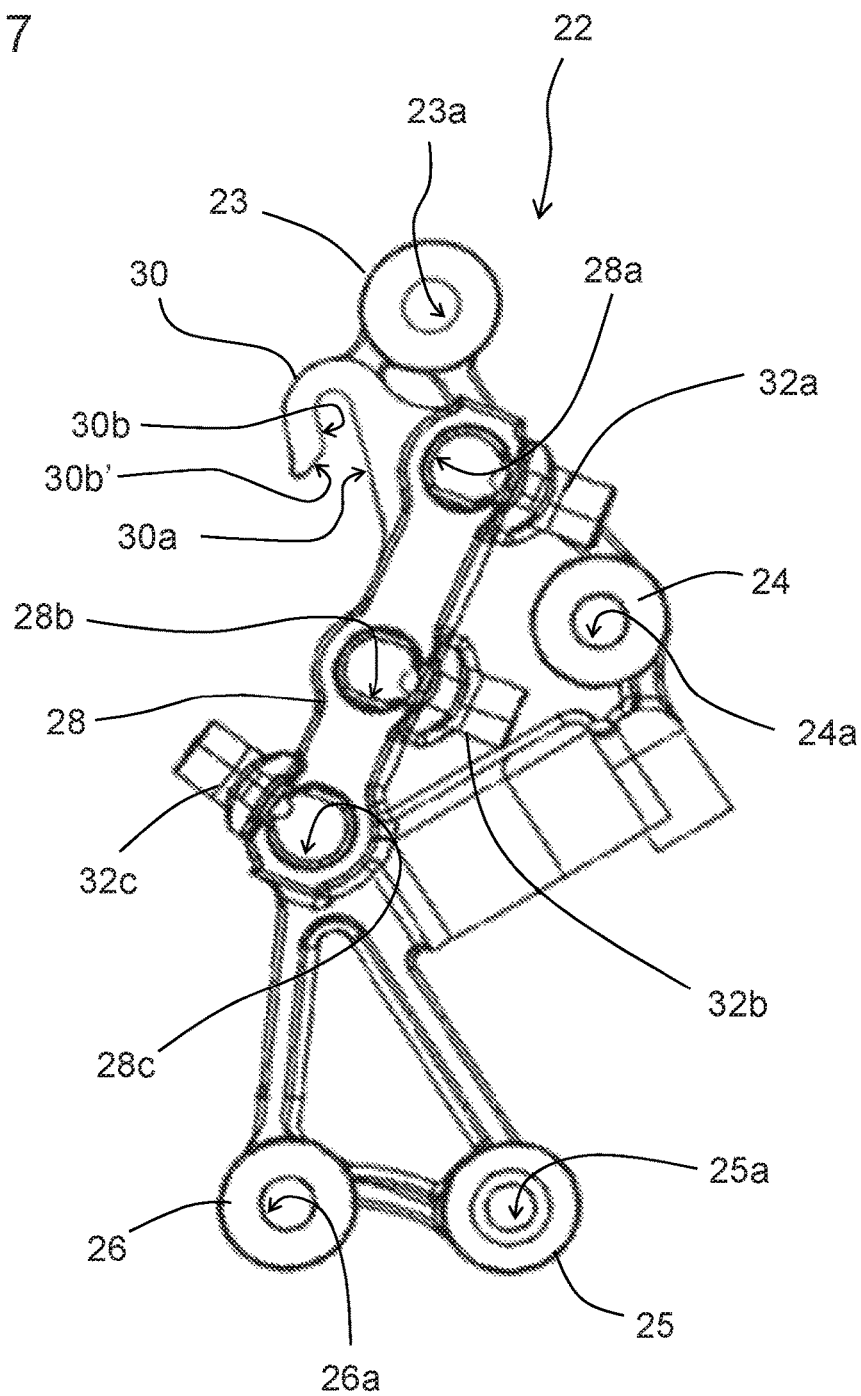
FIG. 7 is a plan view of a pedestal 22.

As illustrated in FIG. 7, the pedestal 22 includes attachment boss portions 23, 24, 25, and 26, a rod support portion 28, and an assembly guide portion 30. In this embodiment, an example of a configuration is given in which the pedestal 22 corresponds to "the supporting member" in the present invention.

As illustrated in FIG. 7, bolt insertion holes 23a, 24a, and 26a, into which bolts BLT are inserted to fasten the pedestal 22 to a clutch housing 12 (described later), are formed in the attachment boss portions 23, 24, and 26. Additionally, a bolt insertion hole 25a, into which a lug bolt LBLT (see FIG. 17) is inserted to fasten the pedestal 22 to the clutch housing 12 (described later) and to perform positioning, is formed in the attachment boss portion 25.

Figure 8:
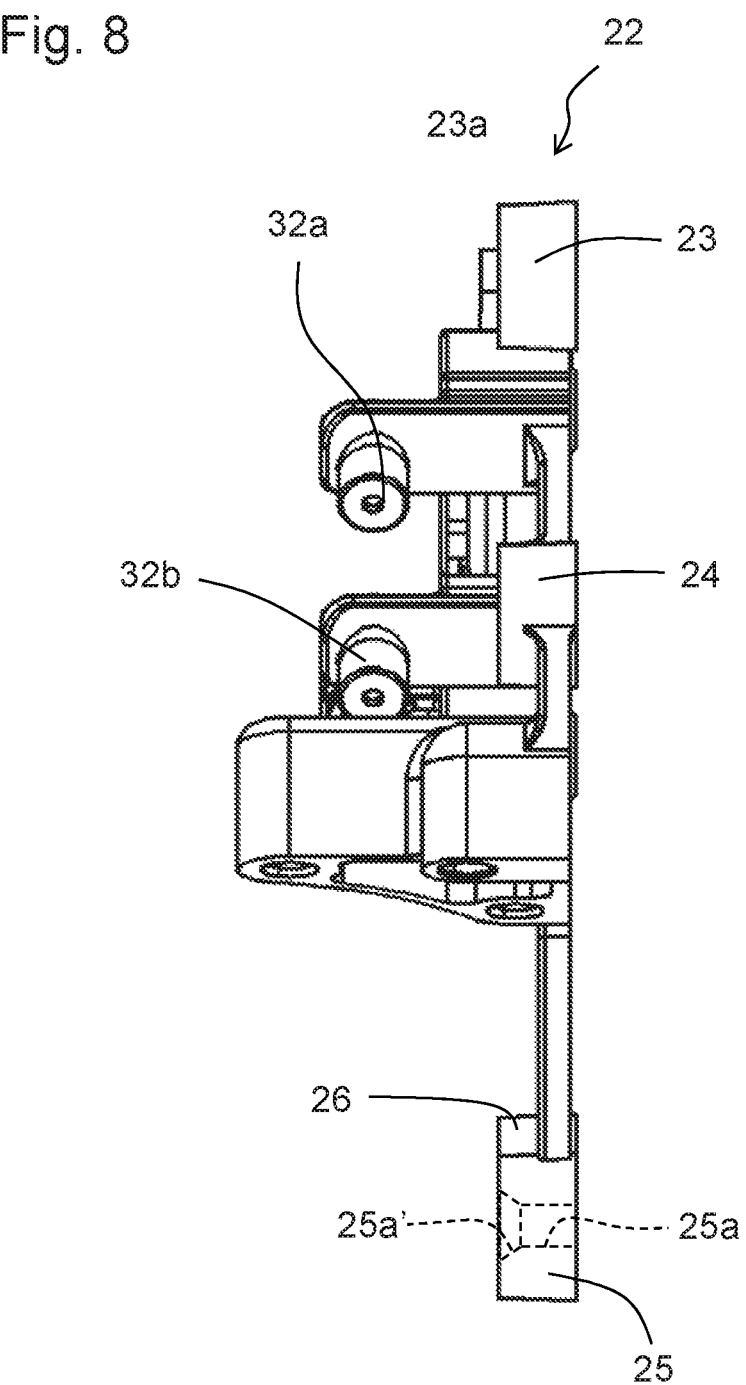
FIG. 8 is a side view of the pedestal 22.

Note that, as illustrated in FIG. 8, a tapered seat 25a' is provided in the bolt insertion hole 25a. The tapered face of the lug bolt LBLT and the tapered seat 25a' of the bolt insertion hole 25a are brought into contact and the pedestal 22 is positioned with respect to the clutch housing 12 by inserting the lug bolt LBLT (see FIG. 17) in the bolt insertion hole 25a. In this embodiment, an example of a configuration is given in which the bolts BLT correspond to "the plurality of bolts" in the present invention, and the lug bolt LBLT corresponds to "the positioning bolt" in the present invention.

Figure 19:
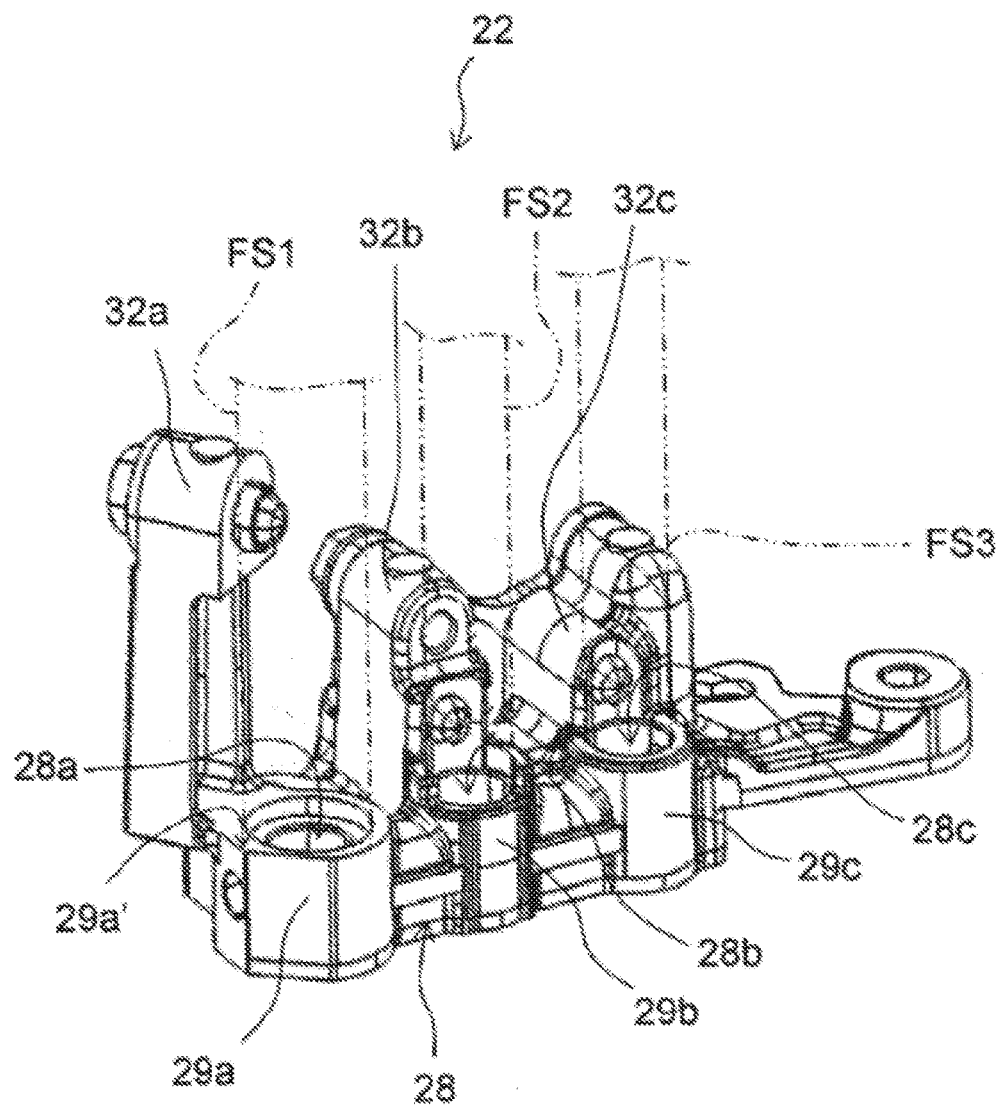
FIG. 19 is a perspective view of the pedestal 22.
Figure 20:
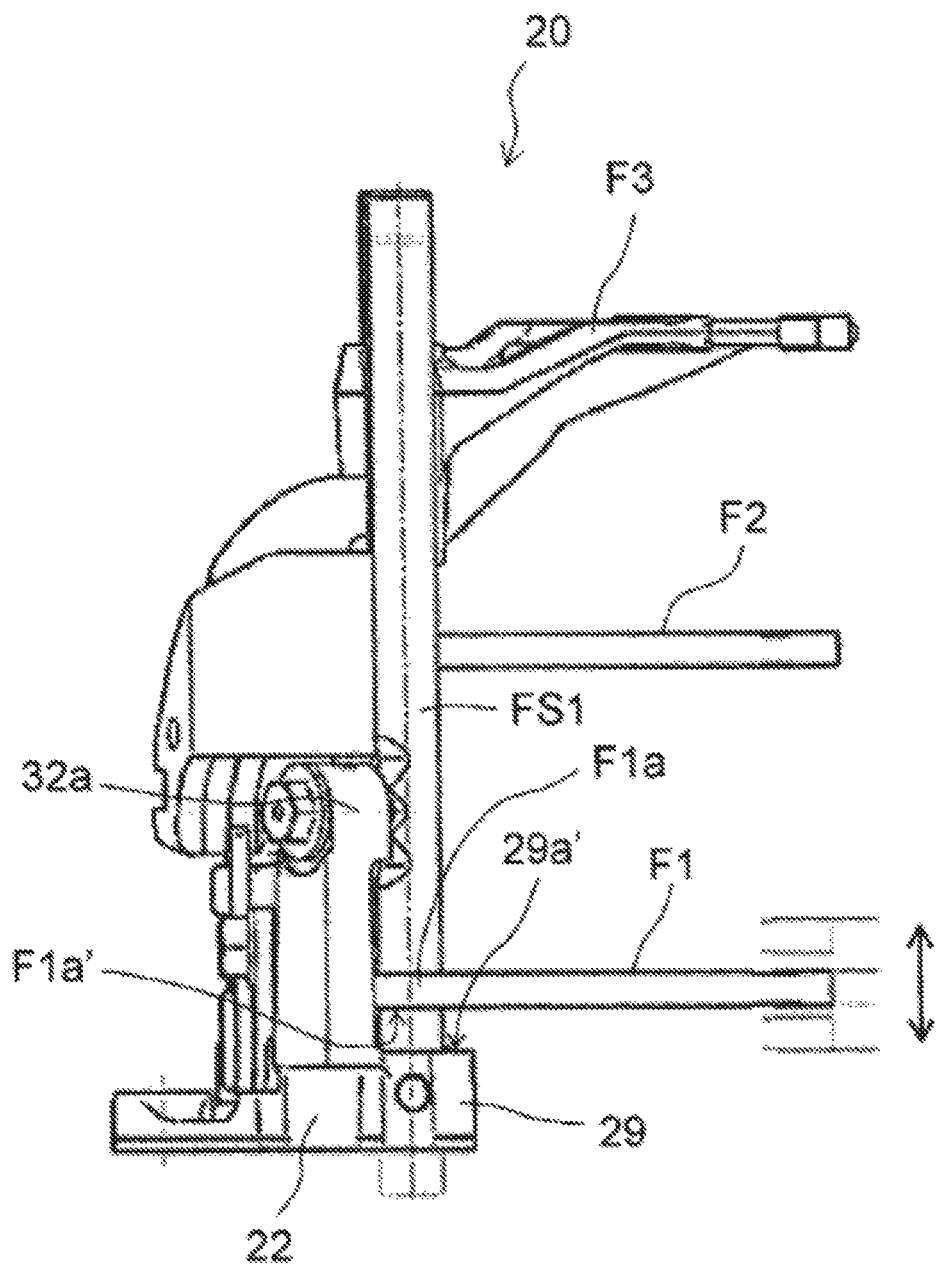
FIG. 20 is an explanatory drawing illustrating a situation when a fork rod FS1 moves in the axial direction.

As illustrated in FIGS. 7 and 19, the rod support portion 28 includes boss portions 29a, 29b, and 29c for supporting the fork rods FS1, FS2, and FS3; and shift check mechanisms 32a, 32b, and 32c. As illustrated in FIG. 19, insertion through holes 28a, 28b, and 28c, into which the fork rods FS1, FS2, and FS3 are inserted, are formed in the boss portions 29a, 29b, and 29c. Additionally, as illustrated in FIG. 20, an edge face 29a' of the boss portion 29a is configured as an abutting face where an edge face F1a' of the connecting portion F1a of the shift fork F1 abuts against when the fork rod FS1 is moved in the axial direction (downward in FIG. 20) to the first-speed establishment side. Note that the edge face 29a' is subjected to flattening processing.

According to this configuration, only the boss portion 29a is used to restrict excessive axial direction movement of the shift fork F1. As such, a stopper mechanism that restricts excessive axial direction movement of the shift fork F1 can easily be obtained. Additionally, as it is not necessary to provide a dedicated stopper component, increases in the number of components can be suppressed.

As illustrated in FIGS. 7 and 19, the shift check mechanisms 32a, 32b, and 32c are provided corresponding to the insertion through holes 28a, 28b, and 28c, and perform positioning in the axial direction of the fork rods FS1, FS2, and FS3 such that the state of the desired gear among the first to fourth-speed driven gears G1', G2', G3', and G4' and the fifth drive gear G5 being fixed to the main shaft 4 or the input shaft 2 or, alternately, the state of the gears being not fixed to the main shaft 4 or the input shaft 2 can be maintained.

Figure 17:
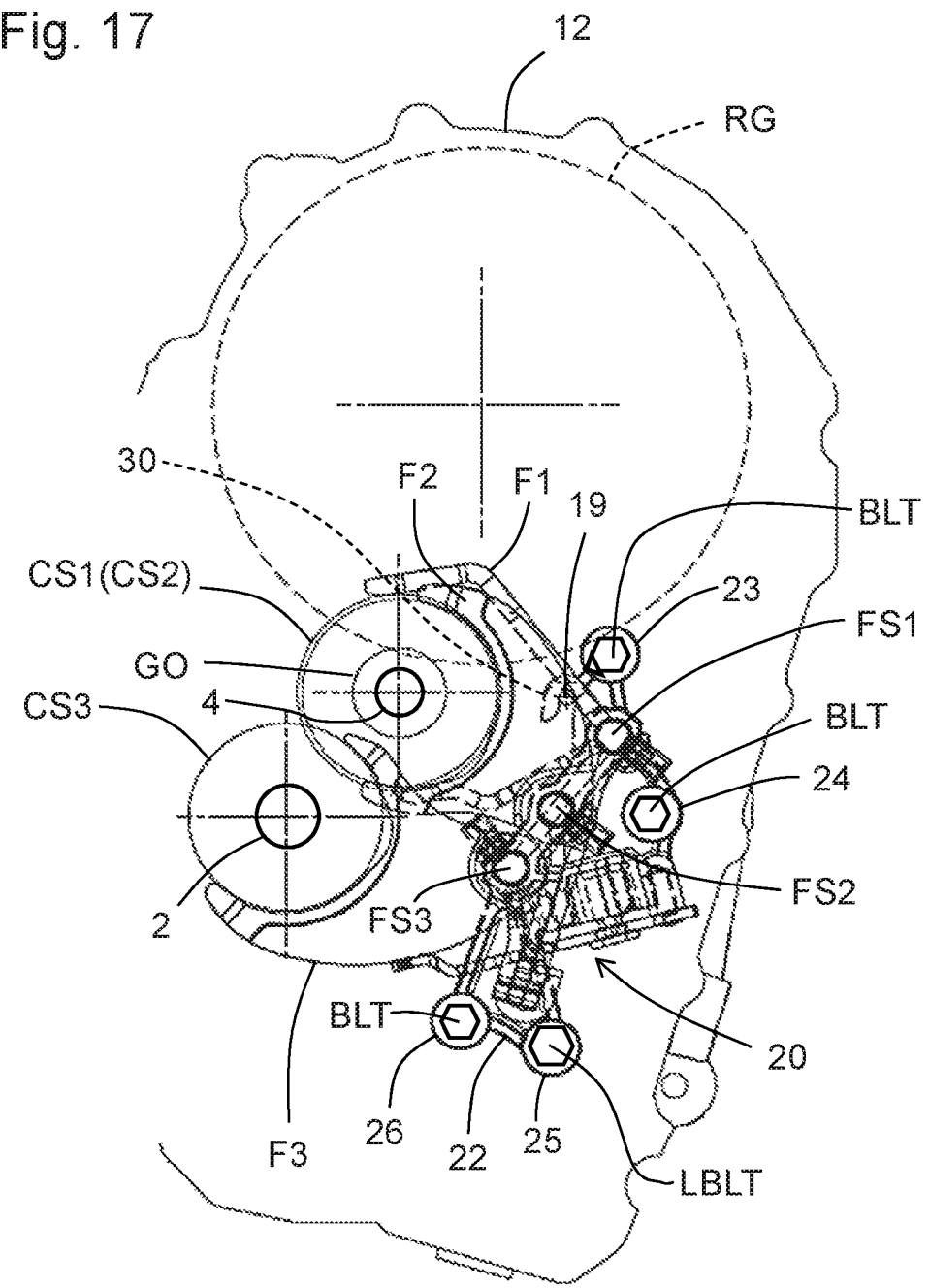
FIG. 17 is an explanatory drawing illustrating a state where a shift fork F3 is engaged with a coupling sleeve C3.

As illustrated in FIG. 7, the assembly guide portion 30 includes a guide face 30a and a guide groove 30b. As illustrated in FIG. 17, in a state where the pedestal 22 is fastened to the clutch housing 12, the guide face 30a is configured to have a shape roughly along an imaginary arc with the axial center of the main shaft 4 as a center. Here, the imaginary arc is configured as a portion of a circle having a radius of a size equal to the sum of a radius of the guide pin 19 and a distance from the axial center of the main shaft 4 to the axial center of the guide pin 19 (described later).

Figure 16:
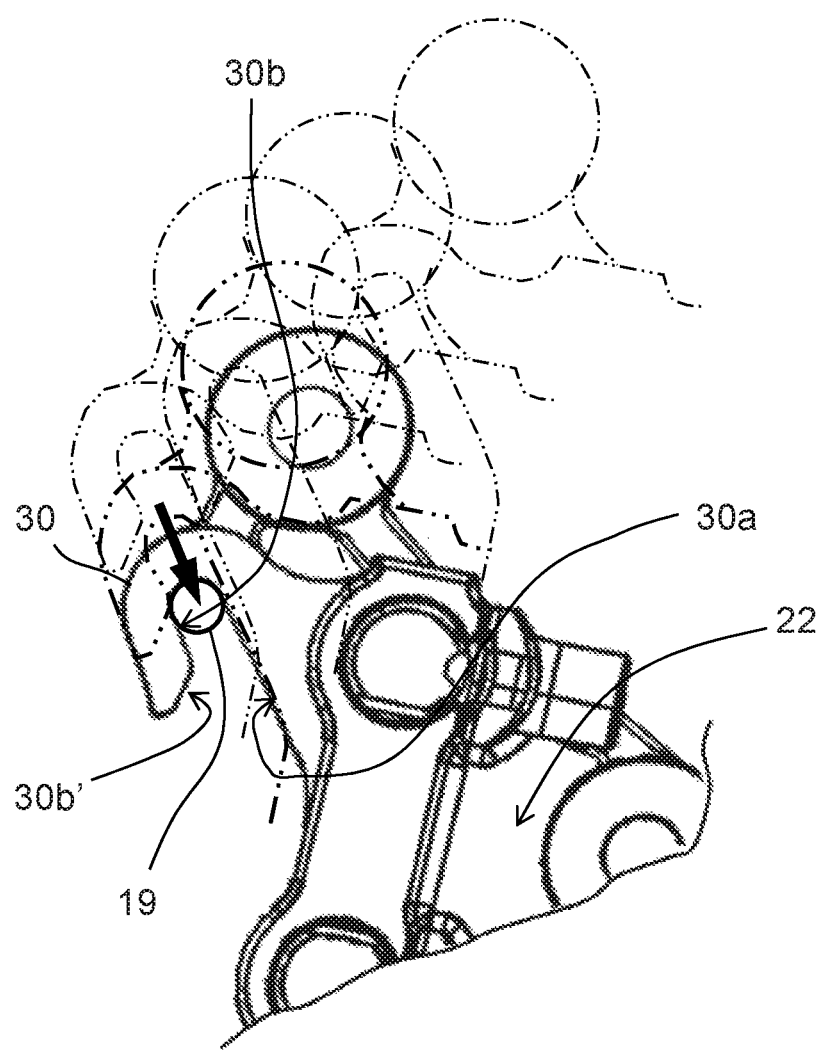
FIG. 16 is an explanatory drawing illustrating a situation where the guide groove 30b has completed engaging with the guide pin 19.

The guide groove 30b is formed so as to be continuous with the guide face 30a. In other words, it can be said that a portion of the guide groove 30b is formed from the guide face 30a. As illustrated in FIG. 16, a bottom portion of the guide groove 30b is formed in a shape matching the shape of the guide pin 19 so that the guide pin 19 (described later) is mateable therewith. That is, the guide groove 30b has a semicircular portion that has the same diameter as the diameter of the guide pin 19.

Additionally, as illustrated in FIG. 17, in a state where the pedestal 22 is fastened to the clutch housing 12, the guide groove 30b is configured such that the center of the semicircular portion described above and the center of the guide pin 19 match.

An inclined face 30b' is formed on an opening portion of the guide groove 30b. The inclined face 30b' has an inclination such that groove width increases with distance from the bottom portion of the guide groove 30b increasing. In this embodiment, an example of a configuration is given in which the assembly guide portion 30 corresponds to "the guide mechanism" in the present invention, and the guide groove 30b corresponds to "the guide groove" in the present invention.

As illustrated in FIG. 1, the differential device 6 includes a large diameter ring gear RG that engages with the output gear GO. The ring gear RG is configured to disperse and transmit drive force to left and right axles WS while absorbing rotational speed differences that occur in the left and right axles WS. The output gear mechanism OGM is constituted by the output gear GO and the ring gear RG.

As illustrated in FIG. 1, the transmission case 8 includes a case main body 10 configured to house the input shaft 2, the main shaft 4, the transmission gear mechanism TM, and the like; and a clutch housing 12 configured to house the clutch (not illustrated), the differential device 6, and the like. In this embodiment, an example of a configuration is given in which the transmission case 8 and the clutch housing 12 correspond to "the case member" in the present invention.

Figure 9:
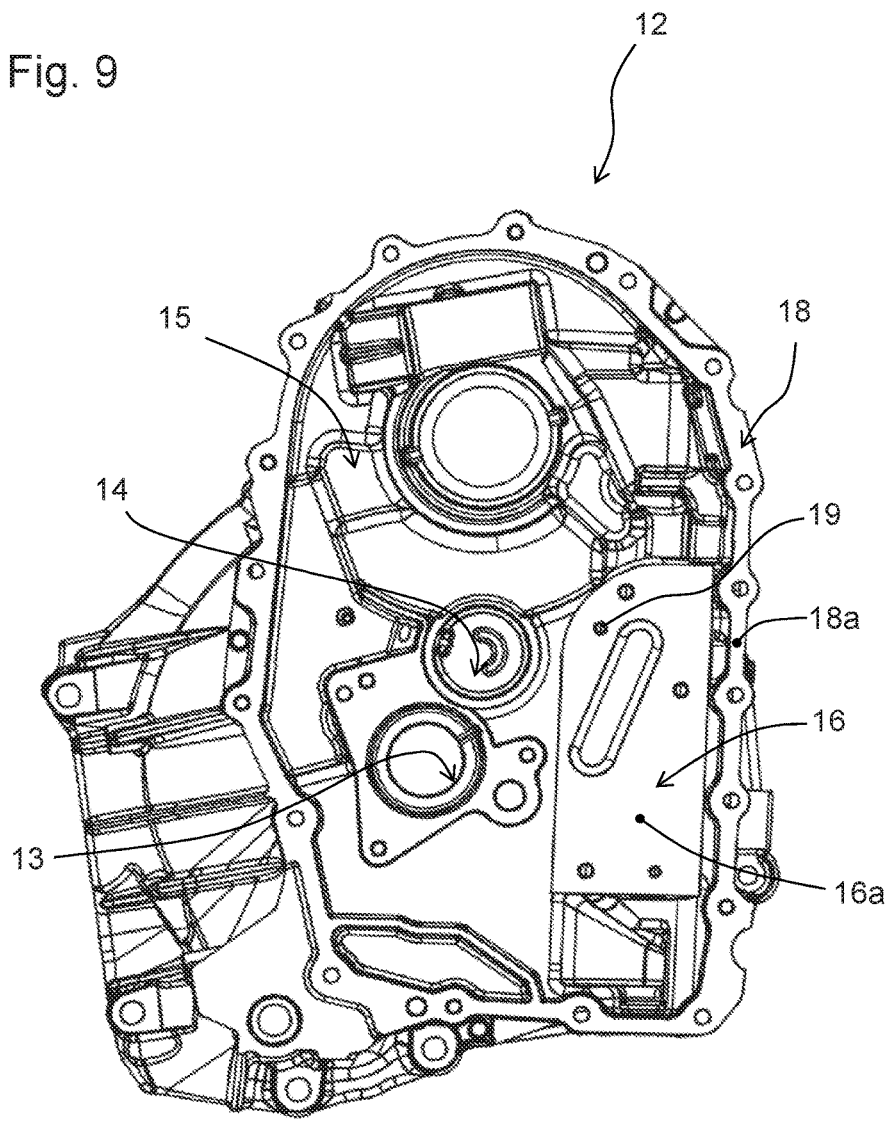
FIG. 9 is a plan view of a clutch housing 12.

As illustrated in FIG. 9, the clutch housing 12 includes shaft supporting portions 13 and 14 that rotatably support the input shaft 2 and the main shaft 4 via the bearings B, a housing portion 15 that houses the differential device 6, an attachment portion 16 to which the pedestal 22 is attached, and an attachment flange 18 to which the case main body 10 is attached. The attachment portion 16 and the attachment flange 18 are configured such that an attachment face 16a and a flange face 18a are flush with each other.

In this embodiment, an example of a configuration is given in which the case main body 10 corresponds to "the case body" in the present invention, and the clutch housing 12 corresponds to "the housing" in the present invention. Additionally, in this embodiment, an example of a configuration is provided in which the attachment face 16a corresponds to "the supporting member attachment face" in the present invention, and the flange face 18a corresponds to "the body attachment face" in the present invention.

Figure 10:
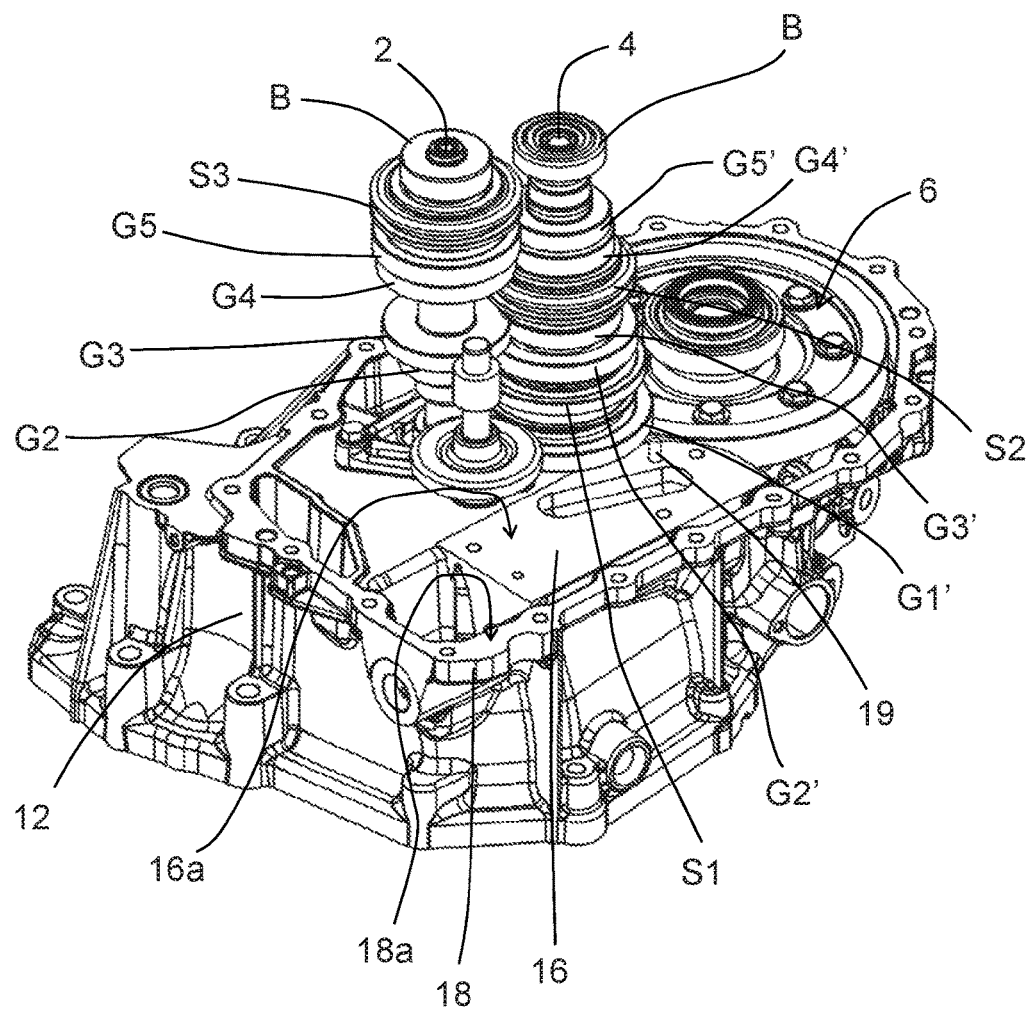
FIG. 10 is an explanatory drawing illustrating an assembled state of an input shaft 2 and a main shaft 4 on the clutch housing 12, on which first to fifth-speed drive gears G1 to G5, first to fifth-speed driven gears G1' to G5', and synchro devices S1 to S3 are assembled.

As illustrated in FIGS. 9 and 10, the guide pin 19 is erected on the attachment face 16a of the attachment portion 16. The guide pin 19 is configured to have a diameter equal to or slightly smaller than the groove width of the guide groove 30b of the assembly guide portion 30 of the pedestal 22. In this embodiment, an example of a configuration is given in which the guide pin 19 corresponds to "the guide mechanism" and "the pin member" in the present invention.

Next, a method for assembling the transmission 1 configured as described above will be described. First, as illustrated in FIG. 10, the differential device 6 is assembled on the housing portion 15 of the clutch housing 12. Next, the fifth-speed drive gear G5 and the fifth-speed synchro device S3 are assembled on the input shaft 2; and the first to fourth-speed driven gears G1', G2', G3', and G4', the first/second-speed synchro device 51, and the third/fourth-speed synchro device S2 are assembled on the main shaft 4. The input shaft 2 and the main shaft 4 are assembled on the shaft supporting portions 13 and 14 of the clutch housing 12 in a state where the first to fifth-speed drive gears G1, G2, G3, G4, and G5 are engaged with the first to fifth-speed driven gears G1', G2', G3', G4', and G5'. At this time, the output gear GO and the ring gear RG are engaged.

In this embodiment, an example of a configuration is given in which the clutch housing 12, on which the input shaft 2, the main shaft 4, the first to fifth-speed drive gears G1, G2, G3, G4, and G5, the first to fifth-speed driven gears G1', G2', G3', G4', and G5', the first/second-speed synchro device S1, the third/fourth-speed synchro device S2, the fifth-speed synchro device S3, and the differential device 6 are assembled, corresponds to "the gear module" in the present invention.

Next, the fork mechanism 20 is assembled on the clutch housing 12, on which the input shaft 2, the main shaft 4, the first to fifth-speed drive gears G1, G2, G3, G4, and G5, the first to fifth-speed driven gears G1', G2', G3', G4', and G5', the first/second-speed synchro device S1, the third/fourth-speed synchro device S2, the fifth-speed synchro device S3, and the differential device 6 have been assembled.

Figure 11:
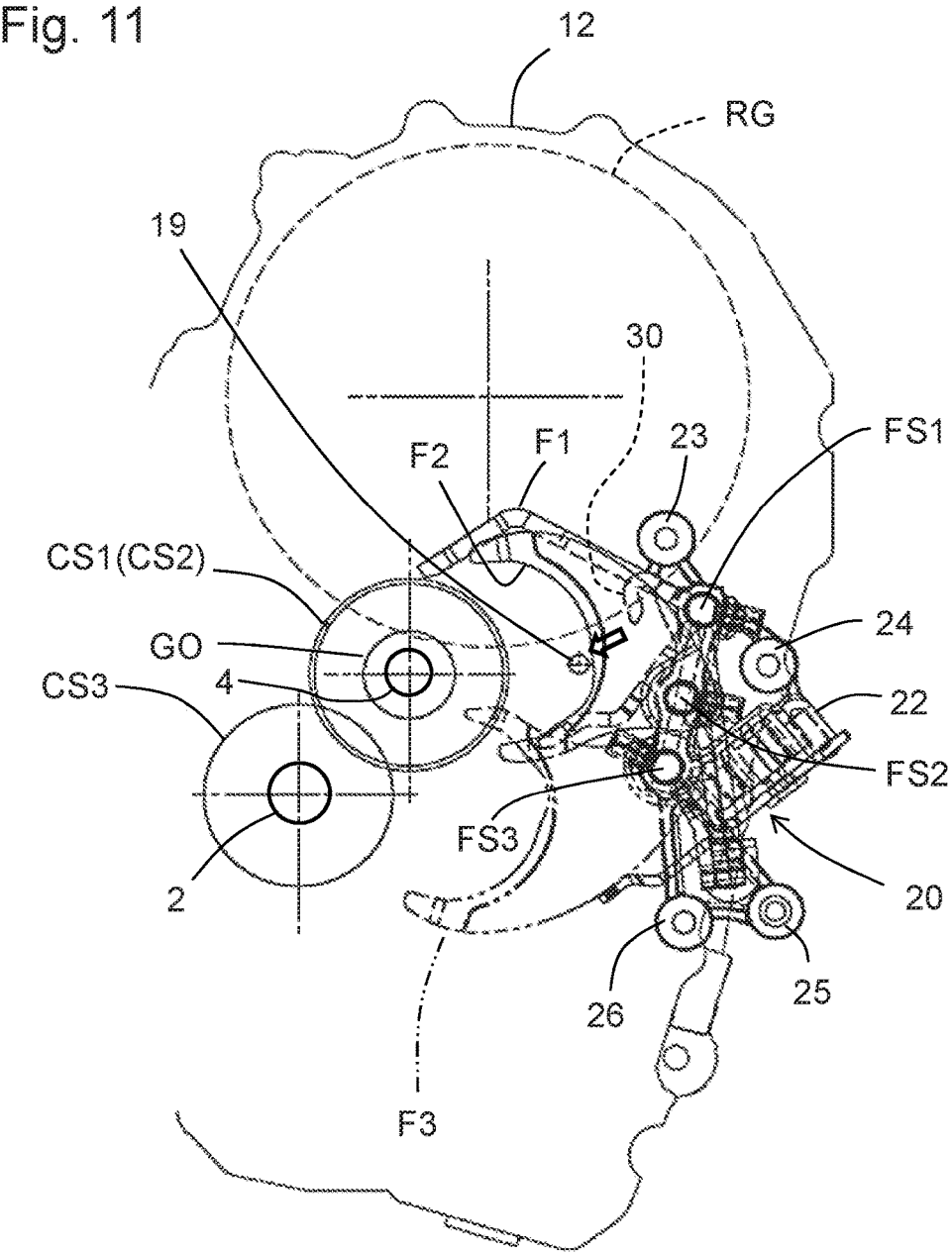
FIG. 11 is an explanatory drawing illustrating a situation where the fork mechanism 20 is assembled on the clutch housing 12.

Specifically, the pedestal 22 is mounted on the attachment face 16a of the attachment portion 16 (FIG. 11) such that the extending directions of the fork rods FS1, FS2, and FS3 are the same directions as the extending directions of the input shaft 2 and the main shaft 4, and the pedestal 22 is slid on the attachment face 16a (FIG. 12) in order to abut the guide face 30a of the assembly guide portion 30 against the guide pin 19. Here, because the attachment face 16a and the flange face 18a are configured to be flush, the sliding of the pedestal 22 on the attachment face 16a is not obstructed by the attachment flange 18. That is, a wide slideable range of the pedestal 22 on the attachment face 16a can be obtained.

Figure 12:
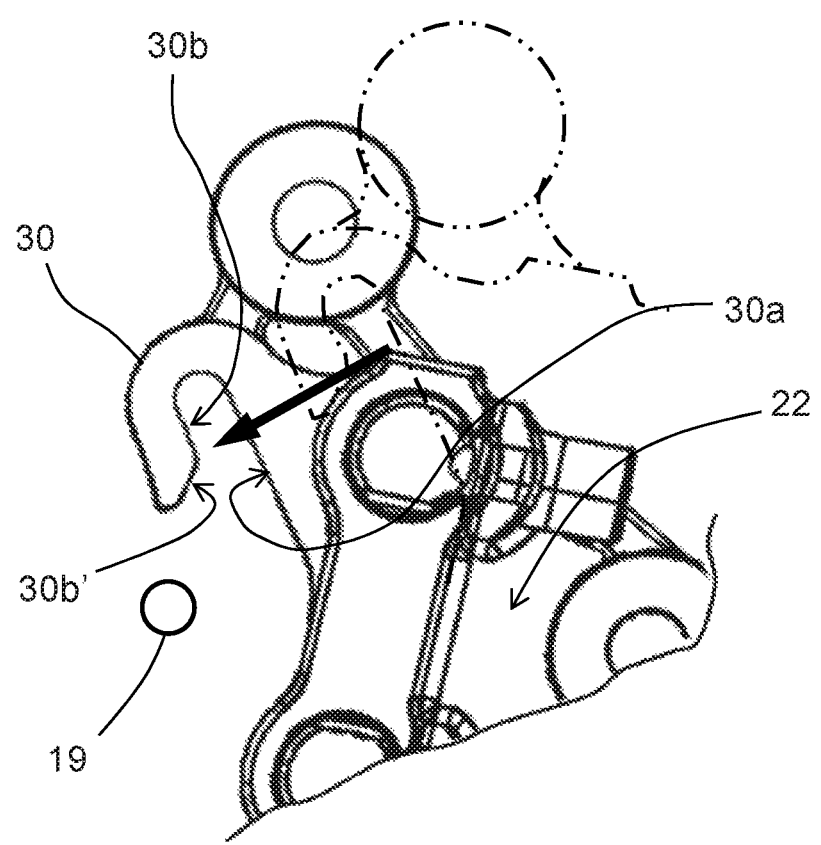
FIG. 12 is an explanatory drawing illustrating positional relationships of an assembly guide portion 30 and a guide pin 19 when the fork mechanism 20 is assembled on the clutch housing 12.

When the positional relationship between the guide face 30a and the guide pin 19 assume the state illustrated in FIG. 12 as a result of sliding the pedestal 22 on the attachment face 16a, the engaging of the shift fork F1 and the shift fork F2 with the coupling sleeve C1 and the coupling sleeve C2 is started. In this embodiment, an example of a configuration is provided in which when the positional relationship of the guide face 30a and the guide pin 19 assume the state illustrated in FIG. 12 corresponds to "when the pin member and the guide groove assume the first state" in the present invention.

Figure 13:
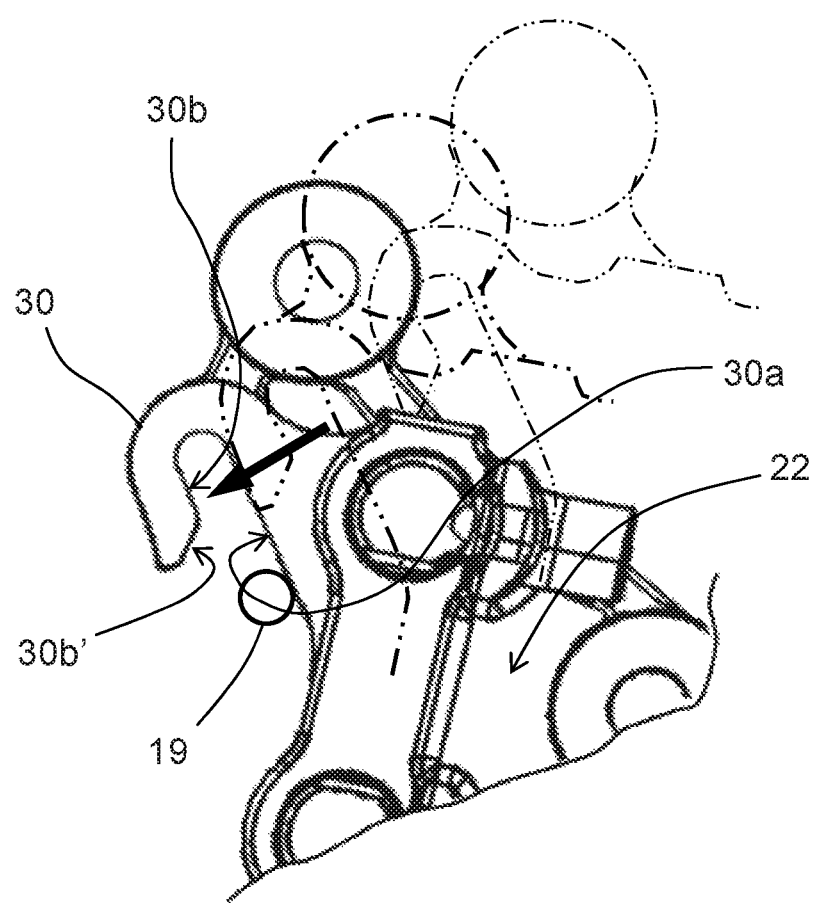
FIG. 13 is an explanatory drawing illustrating a state where a guide face 30a is in contact with the guide pin 19.
Figure 14:
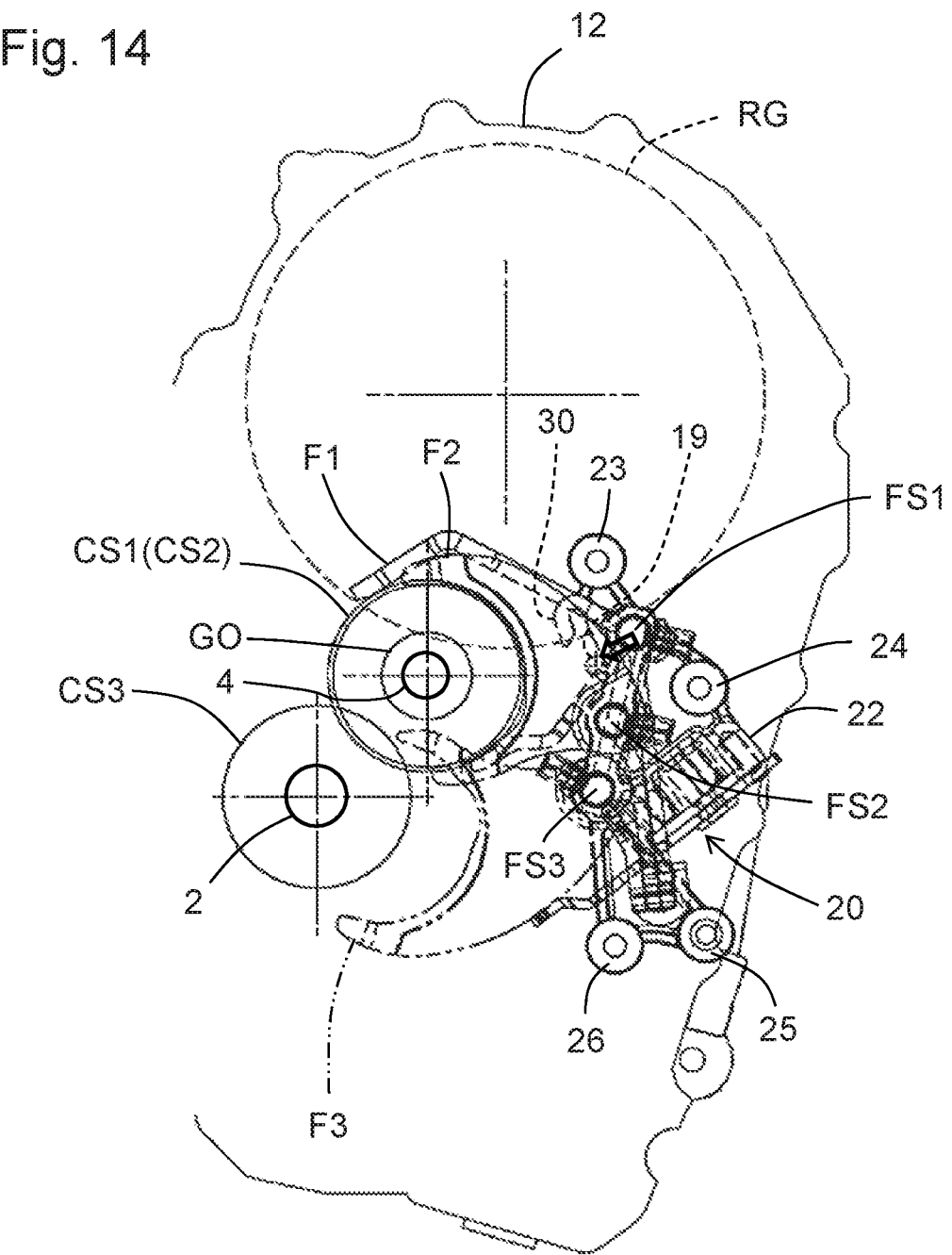
FIG. 14 is an explanatory drawing illustrating a state where shift forks F1 and F2 are engaged with coupling sleeves C1 and C2.

Then, as illustrated in FIG. 13, when the guide face 30a is abutted against the guide pin 19, the engaging of the shift fork F1 and the shift fork F2 with the coupling sleeve C1 and the coupling sleeve C2 is completed, and the engaging of the shift fork F3 with the coupling sleeve C3 of the fifth-speed synchro device S3 is started (FIG. 14). In this embodiment, an example of a configuration is given in which when the guide face 30a is abutted against the guide pin 19 corresponds to "when the pin member and the guide groove assume the second state" in the present invention.

Figure 15:
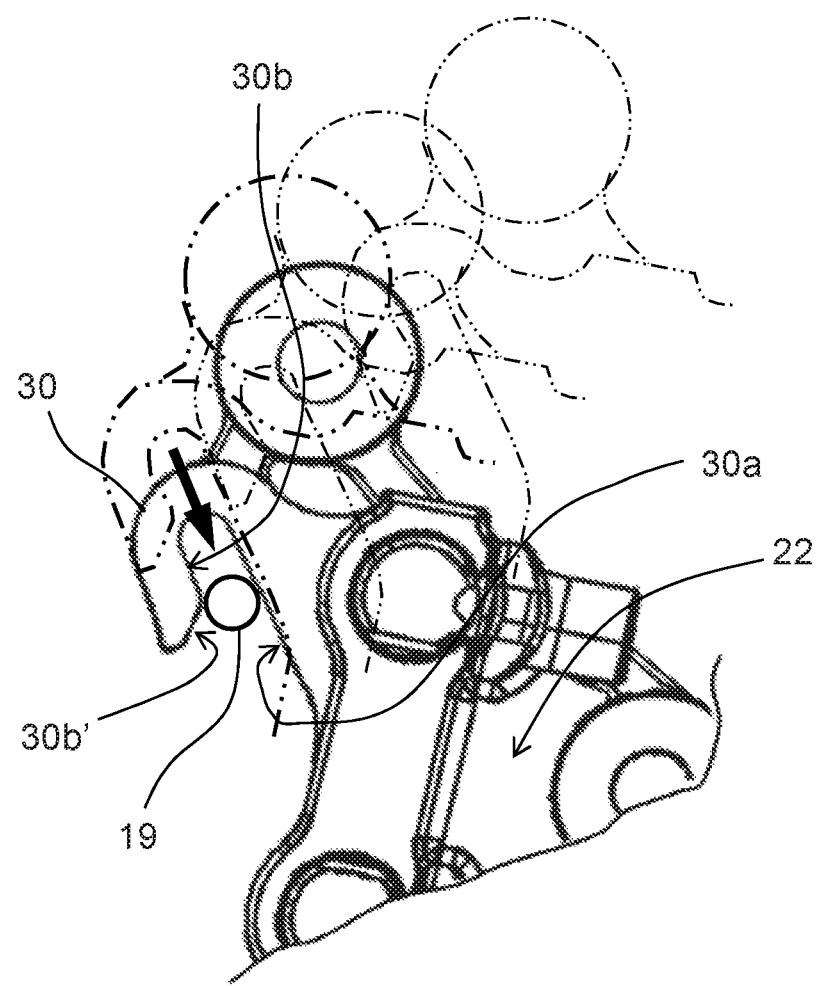
FIG. 15 is an explanatory drawing illustrating a situation where a guide groove 30b has started to engage with the guide pin 19.

Next, as illustrated in FIG. 15, in order to engage the guide groove 30b with the guide pin 19, the pedestal 22 is slid on the attachment face 16a (FIG. 15) in a state where the guide pin 19 is abutted against the guide face 30a. At this time, the pedestal 22 rotates around the axial center of the main shaft 4 because the guide face 30a is configured to have a shape, with the axial center of the main shaft 4 as a center, roughly along an imaginary arc with a radius equal to from the axial center thereof to the side far from the axial center of the guide pin 19. As a result, the engaging of the shift fork F3 with the coupling sleeve C3 of the fifth-speed synchro device S3 is performed in a smooth manner.

Note that the engaging of the guide pin 19 in the guide groove 30b can be performed in a smooth manner due to the inclined face 30b' being provided on the opening portion of the guide groove 30b.

Thus, in the present embodiment, a configuration is given in which, first, the shift forks F1 and F2 below (downward in FIG. 4) the fork rods FS1, FS2, and FS3 in the axial direction are engaged with the coupling sleeves C1 and C2 and, thereafter, the shift fork F3 above (upward in FIG. 4) the fork rods FS1, FS2, and FS3 in the axial direction is engaged with the coupling sleeve C3. In other words, a configuration is given in which the shift fork F3 is engaged with the last coupling sleeve C3 in an easy-to-see manner. As such, ease of assembly is excellent.

Then, as illustrated in FIG. 16, when the engaging of the guide groove 30b with the guide pin 19 is completed, the engaging of the shift fork F3 with the coupling sleeve C3 of the fifth-speed synchro device S3 is completed (FIG. 17). In this embodiment, an example of a configuration is given in which when the engaging of the guide groove 30b with the guide pin 19 is completed corresponds to "when the pin member and the guide groove assume the third state" in the present invention.

Figure 18:
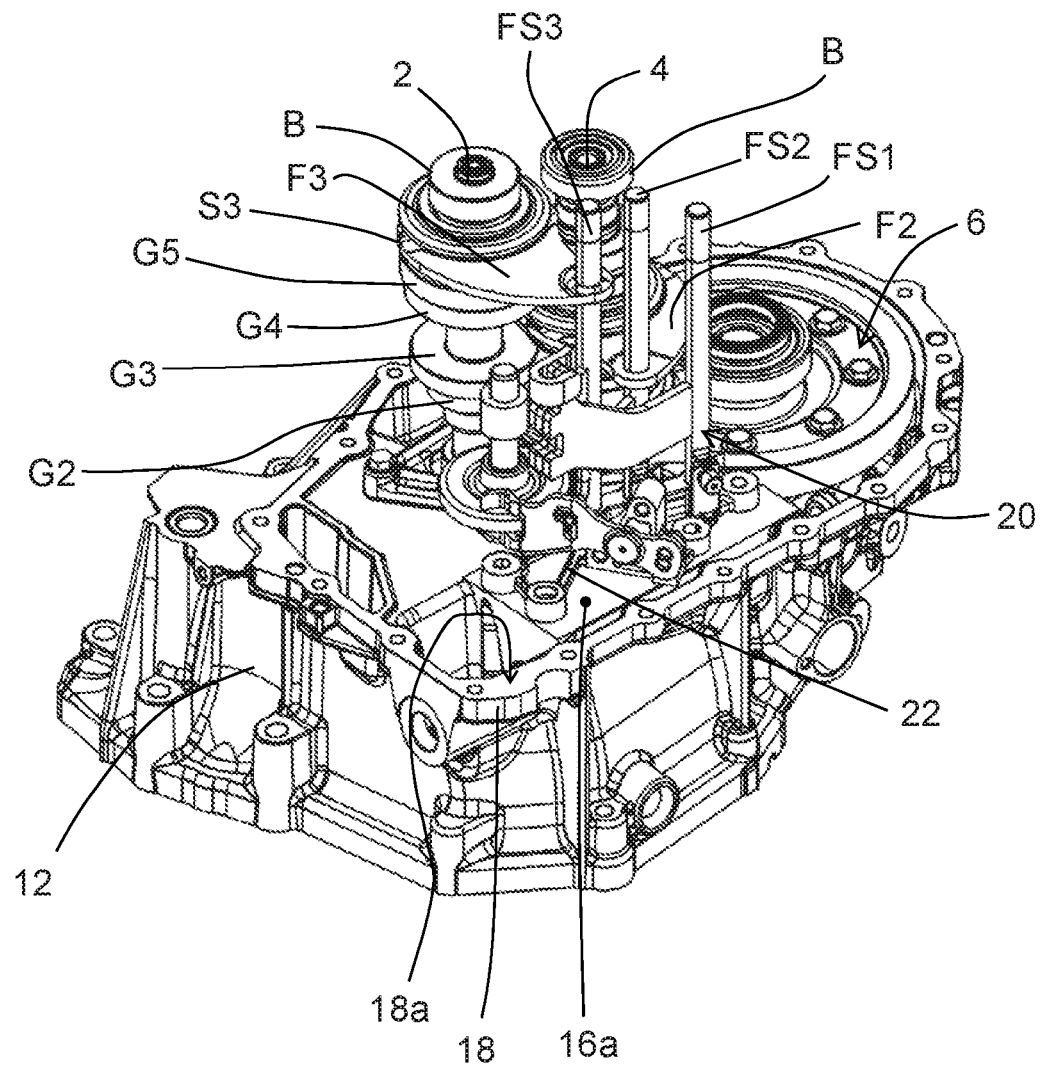
FIG. 18 is an explanatory drawing illustrating a situation where the assembly of the fork mechanism 20 on the clutch housing 12 is completed.

In this state, first, the lug bolt LBLT (see FIG. 17) is inserted into and tightened in the bolt insertion hole 25a, and then the bolts BLT (see FIG. 17) are inserted into and tightened in the bolt insertion holes 23a, 24a, and 26a. As a result, the pedestal 22 is fastened to the clutch housing 12 (FIGS. 17 and 18) in a state of being positioned by the lug bolt LBLT and the bolt insertion hole 25a, and the guide pin 19 and the guide groove 30b.

Lastly, the case main body 10 is placed over the clutch housing 12 so as to cover the input shaft 2, the main shaft 4, the first to fifth-speed drive gears G1, G2, G3, G4, and G5, the first to fifth-speed driven gears G1', G2', G3', G4', and G5', the first/second-speed synchro device 51, the third/fourth-speed synchro device S2, the fifth-speed synchro device S3, the differential device 6, and the fork mechanism 20; and the case main body 10 is fastened to the clutch housing 12 by bolts (not illustrated).

In the present embodiment, a configuration is provided in which the assembly guide portion 30 including the guide face 30a and the guide groove 30b is provided on the pedestal 22, and the guide pin 19 is provided on the clutch housing 12, but a reverse configuration is also possible. That is, a configuration is possible in which the guide pin 19 is disposed on the pedestal 22, and the assembly guide portion 30 including the guide face 30a and the guide groove 30b is disposed on the clutch housing 12.

In the present embodiment, a configuration is given in which the guide face 30a is not guided until abutting against the guide pin 19, but a configuration is possible in which the guide face 30a is guided until abutting against the guide pin 19. In this case, it is sufficient that a configuration is given in which a guide face or a guide groove, capable of guiding the guide face 30a until abutting against the guide pin 19, be provided on the assembly guide portion 30.

In the present embodiment, a configuration is provided in which, in the state where the pedestal 22 is fastened to the clutch housing 12, the guide face 30a has a shape roughly along an imaginary arc with the axial center of the main shaft 4 as a center and a radius equal to from the axial center of the main shaft 4 to the side far from the axial center of the guide pin 19. However, the shape of the guide face 30a is not limited thereto. For example, a configuration is possible in which the guide face 30a has a linear shape capable of guiding the guide pin 19 toward the guide groove 30b.

In the present embodiment, a configuration is provided in which the shift fork F3 above (upward in FIG. 4) the fork rods FS1, FS2, and FS3 in the axial direction is engaged last with the coupling sleeve C3. However, a reverse configuration is possible in which the shift fork F3 above (upward in FIG. 4) the fork rods FS1, FS2, and FS3 in the axial direction is engaged first with the coupling sleeve C3.

In the present embodiment, a configuration is provided in which the shift forks F1 and F2 are engaged with the coupling sleeves C1 and C2 of the synchro devices S1 and S2 fixed to the main shaft 4 and, thereafter, the shift fork F3 is engaged with the coupling sleeve C3 of the synchro device S3 fixed to the input shaft 2. However, a reverse configuration is possible in which the shift fork F3 is engaged with the coupling sleeve C3 of the synchro device S3 fixed to the input shaft 2 and, thereafter, the shift forks 11 and F2 are engaged with the coupling sleeves C1 and C2 of the synchro devices S1 and S2 fixed to the main shaft 4. Note that in this case, an example of a configuration is given in which the input shaft 2 corresponds to "the first shaft" in the present invention, and the main shaft 4 corresponds to "the second shaft" in the present invention.

In the present embodiment, a configuration is provided in which the fork mechanism 20 includes the three fork rods FS1, FS2, and FS3, but the number of fork rods is not limited thereto. For example, configurations in which the fork mechanism 20 includes two fork rods or configurations in which the fork mechanism 20 includes four or more fork rods are possible.

Note that, in cases where a configuration is adopted in which the fork mechanism 20 includes four or more fork rods, it is sufficient that a configuration is used in which the shift forks are connected to the fork rods such that the opening directions of the inner circumferential faces of the arcs of the shift forks, which engage with the synchro devices disposed on the input shaft 2, are substantially the same; and, also, the shift forks are connected to the fork rods such that the opening directions of the inner circumferential faces of the arcs of the shift forks, which engage with the synchro devices disposed on the main shaft 4 are substantially the same.

In the present embodiment, a configuration is provided in which the engaging of the shift fork F3 with the coupling sleeve C3 of the fifth-speed synchro device S3 is started when the engaging of the shift fork F1 and the shift fork F2 with the coupling sleeve C1 and the coupling sleeve C2 has been completed. However, the timing at which the engaging is started is not limited thereto. For example, a configuration is possible in which the engaging of the shift fork F3 with the coupling sleeve C3 of the fifth-speed synchro device S3 is started before the engaging of the shift fork F1 and the shift fork F2 with the coupling sleeve C1 and the coupling sleeve C2 is completed.

In the present embodiment, a configuration is provided in which only excessive axial direction movement to the first-speed establishment side of the fork rod FS1 is restricted using the boss portion 29a. However, the restriction of movement in the axial direction is not limited thereto. For example, configurations in which excessive axial direction movement to the third-speed establishment side of the fork rod FS2 is restricted using the boss portion 29b, or configurations in which excessive axial direction movement to the fifth-speed establishment side of the fork rod FS3 is restricted using the boss portion 29c are possible.

In the present embodiment, rocking of the shift heads SH1, SH2, and SH3 (pivoting of the fork rods FS1, FS2, and FS3) is restricted by the bent portion SH3' provided on the shift head SH3. However, the restriction of the rocking is not limited thereto.

Figure 21:
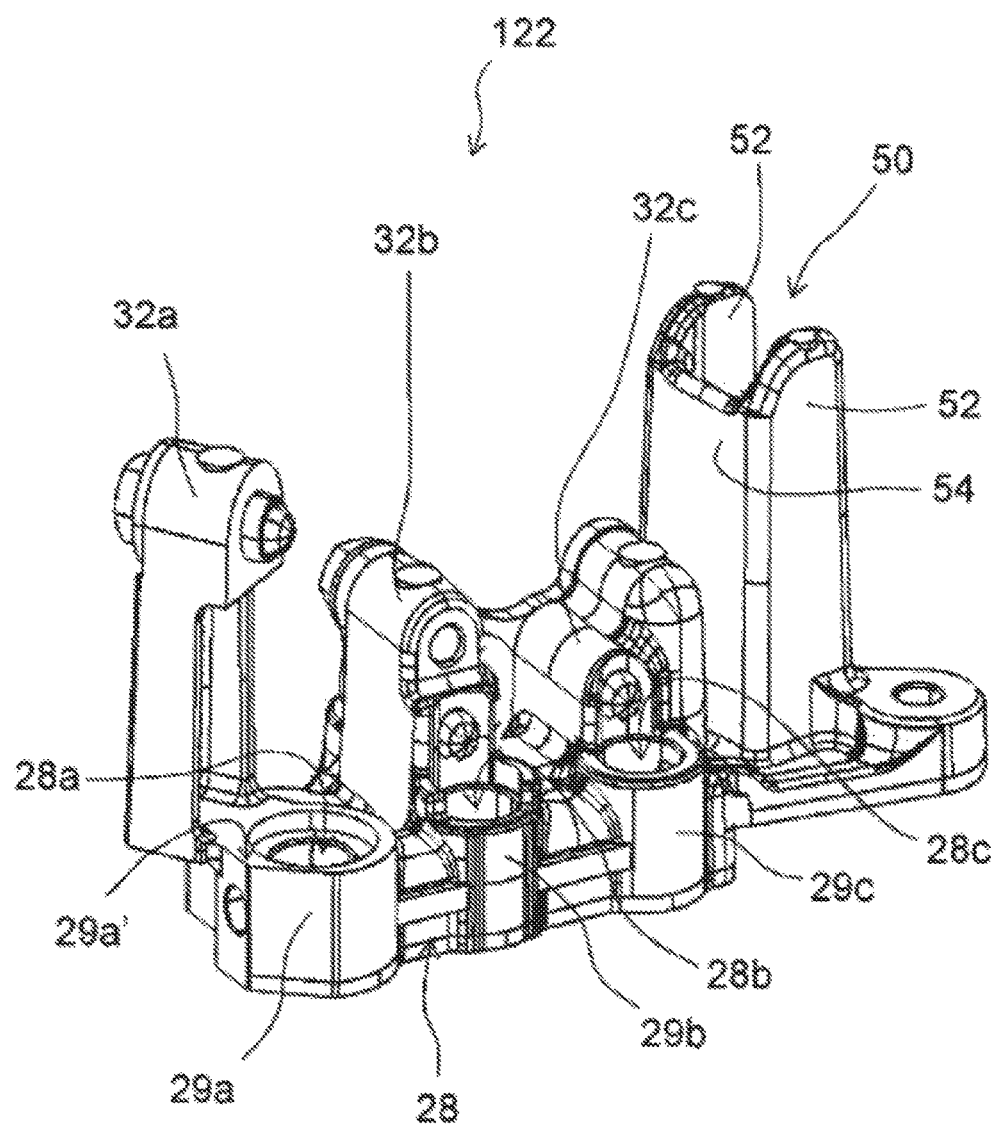
FIG. 21 is a perspective view of a pedestal 122 of a modified example.
Figure 22:
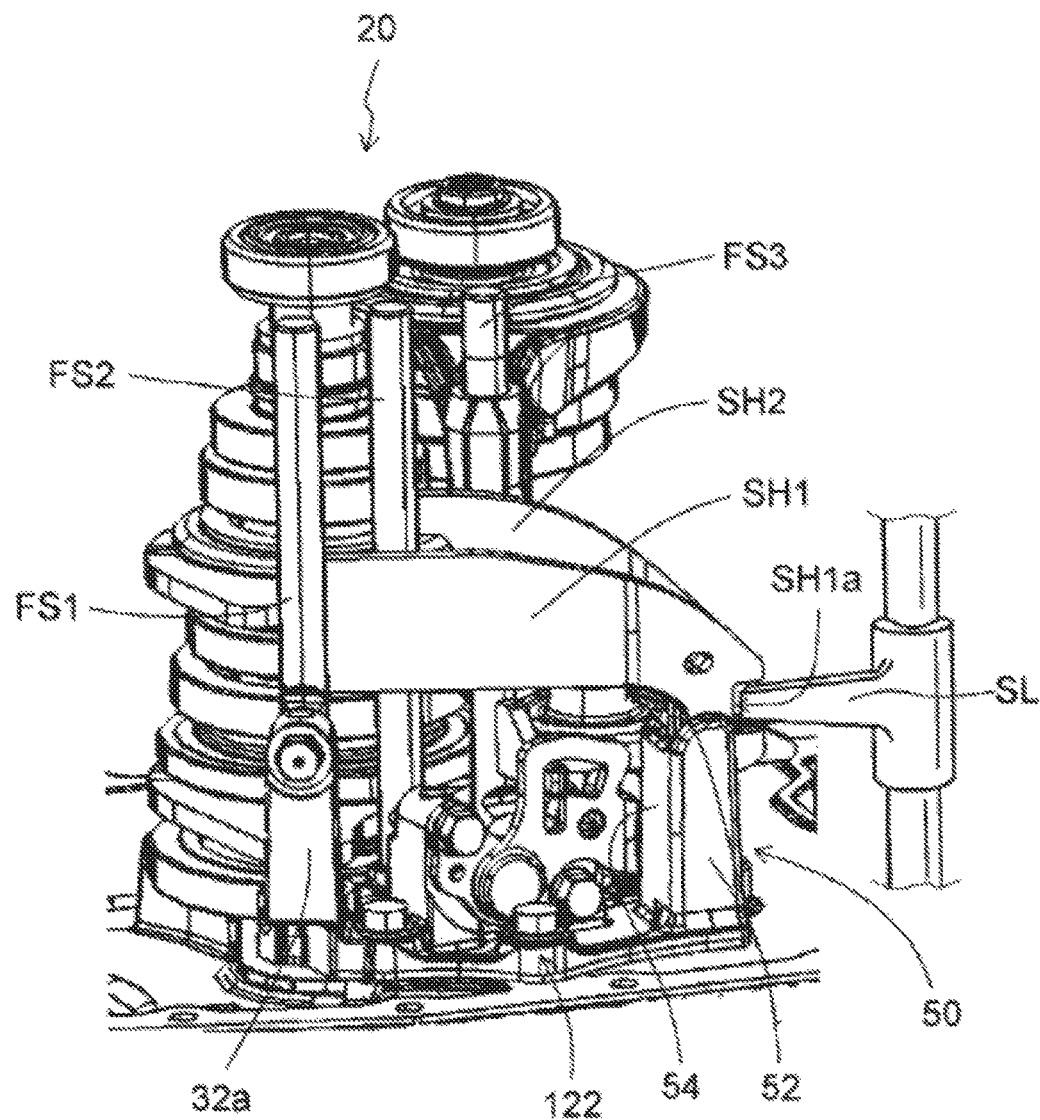
FIG. 22 is an explanatory drawing illustrating a situation where rocking of shift heads SH1, SH2, and SH3 is restricted by a restricting portion 50.

For example, as illustrated by a pedestal 122 of a modified example illustrated in FIGS. 21 and 22, a configuration is possible in which a restricting portion 50 is provided integrally with the pedestal 122 that restricts the rocking of the shift heads SH1, SH2, and SH3 (pivoting of the fork rods FS1, FS2, and FS3).

As illustrated in FIG. 21, the restricting portion 50 is configured such that a cross-sectional shape across a face perpendicular to the longitudinal direction is substantially a U-shape, and includes a pair of restricting walls 52 and a connecting wall 54 that connects the pair of restricting walls 52. Moreover, as illustrated in FIG. 22, the shift heads SH1, SH2, and SH3 are disposed between the pair of restricting walls 52 and, as a result, rocking of the shift heads SH1, SH2, and SH3 (pivoting of the fork rods FS1, FS2, and FS3) can be restricted. As a result, mismatching of the grooves SH1a, SH2a, and SH3a and the occurrence of engagement failures of the grooves SH1a, SH2a, and SH3a with the shift lever SL can be prevented. In this embodiment, an example of a configuration is provided in which the pair of restricting walls 52 corresponds to "the wall portions" in the present invention.

Alternatively, for example, a configuration is possible in which the pivoting of the fork rods FS1, FS2, and FS3 is restricted by forming a flat portion on the outer circumferential surface of the fork rods FS1, FS2, and FS3, integrally forming the wall portions facing this flat portion with the pedestal 22, and abutting the flat portion against the wall portions.

The present embodiment is applied to a transmission for a front engine/front drive (FF) vehicle to be mounted in an FF vehicle, but may also be applied to a transmission for a front engine/rear drive (FR) vehicle to be mounted in an FR vehicle.

The present embodiment should be construed as an illustration of an example of an embodiment of the present invention. Accordingly, the present invention is not limited to the configuration of the present embodiment.

The invention claimed is:

1. A transmission, comprising:
   a case member;
   a gear module including
      a first shaft supported by the case member,
      a second shaft supported by the case member so as to be parallel with the first shaft,
      a first idler gear supported by the first shaft so as to be relatively rotatable with respect to the first shaft,
      a first fixed gear fixed to the second shaft so as to engage the first idler gear,
      a second idler gear supported by the second shaft so as to be relatively rotatable with respect to the second shaft,
      a second fixed gear fixed to the first shaft so as to engage the second idler gear,
      a first fixing member disposed on the first shaft and configured to fix the first idler gear to the first shaft and release the first idler gear from the first shaft, and
      a second fixing member disposed on the second shaft and configured to fix the second idler gear to the second shaft and release the second idler gear from the second shaft;
   a fork module including
      a first shift fork configured to engage the first fixing member,
      a first fork shaft supporting the first shift fork,
      a second shift fork configured to engage with the second fixing member,
      a second fork shaft supporting the second shift fork, and
      a supporting member supporting the first fork shaft and the second fork shaft so as to be movable in an axial direction; and
   a guide mechanism configured to guide the fork module such that, when assembling the fork module to the case member to which the gear module has been assembled, the engaging of the second shift fork with the second fixing member is started after the engaging of the first shift fork with the first fixing member has been started.

2. The transmission according to claim 1, wherein the guide mechanism is configured to guide the fork module such that the second shift fork engages with the second fixing member after guiding the fork module such that the first shift fork engages with the first fixing member.

3. The transmission according to claim 2, wherein the guide mechanism is configured to engage the second shift fork with the second fixing member by rotating the fork module about an axial center of the first shaft.

4. The transmission according to claim 1, wherein the guide mechanism includes
   a pin member disposed in one of the case member and the supporting member, and
   a guide groove disposed in another of the case member and the supporting member, with which the pin member is engageable.

5. The transmission according to claim 4, further comprising
   a plurality of bolts configured to fix the supporting member to the case member;
      one of the plurality of bolts being a positioning bolt capable of restricting relative positions between the supporting member and the case member, and the supporting member being configured to be positioned with respect to the case member by the positioning bolt and the engaging of the pin member with the guide groove.

6. The transmission according to claim 4, wherein the guide groove is configured to have a shape along an imaginary arc with an axial center of the first shaft as a center and a radius of a size equal to the sum of a radius of the pin member and a distance from the axial center to a center of the pin member.

7. The transmission according to claim 4, wherein the guide mechanism is configured such that
the engaging of the first shift fork with the first fixing member is started when the pin member and the guide groove assume a first state;
the engaging of the second shift fork with the second fixing member is started together with completing of the engaging of the first shift fork with the first fixing member, when the pin member and the guide groove assume a second state; and
the engaging of the second shift fork with the second fixing member is completed when the pin member and the guide groove assume a third state.

8. The transmission according to claim 7, wherein the gear module further comprises
a third idler gear supported by the first shaft so as to be relatively rotatable with respect to the first shaft,
a third fixed gear fixed to the second shaft so as to engage the third idler gear, and
a third fixing member disposed on the first shaft and configured to fix the third idler gear to the first shaft and release the third idler gear from the first shaft,
the fork module further comprises
a third shift fork configured to engage the third fixing member, and
a third fork shaft supporting the third shift fork, and
the fork module being configured such that the engaging of the third shift fork the third fixing member is started at substantially the same timing as a timing at which the engaging of the first shift fork with the first fixing member is started.

9. The transmission according to claim 8, wherein the third shift fork is configured such that
the engaging with the third fixing member is started at the first state, and
the engaging with the third fixing member is completed at the second state.

10. The transmission according to claim 8, wherein the supporting member further comprises a restricting portion configured to restrict pivoting of the first, the second, and the third fork shafts.

11. The transmission according to claim 10, further comprising
a shift lever configured to operate in accordance with shifting operations of an operator,
first, second, and third arm parts including grooves engageable with the shift lever being fixed to the first, second, and third fork shafts,
the first, second, and third arm parts being disposed adjacent to each other such that the grooves are matched and a single groove extending in a direction orthogonal to an axial direction of the first, second, and third fork shafts is formed, and
the restricting portion including a pair of wall portions erected integrally with the supporting member so as to face the arm parts, among the first, second, and third arm parts, that are disposed on both ends in the extending direction of the single groove.

12. The transmission according to claim 7, wherein the gear module further comprises
a fourth idler gear supported by the second shaft so as to be relatively rotatable with respect to the second shaft,
a fourth fixed gear fixed to the first shaft so as to engage with the fourth idler gear, and
a fourth fixing member disposed on the second shaft and configured to fix the fourth idler gear to the second shaft and release the fourth idler gear from the second shaft,
the fork module further comprises
a fourth shift fork configured to engage the fourth fixing member, and
a fourth fork shaft supporting the fourth shift fork, and
the fourth shift fork is configured such that the engaging the fourth fixing member is started at the second state, and the engaging with the fourth fixing member is completed at the third state.

13. The transmission according to claim 1, wherein the first and second fixing members are configured to be activated via the first and second shift forks due to the first and second fork shafts moving in the axial direction, and
the supporting member is configured to be capable of positioning axial direction positions of the first and second fork shafts such that the fixing of the first and second idler gears to the first and second shafts by the first and second fixing members is maintained, and configured to be capable of positioning axial direction positions of the first and second fork shafts such that the releasing of the first and second idler gears from the first and second shafts by the first and second fixing members is maintained.

14. The transmission according to claim 1, wherein the supporting member includes first and second boss portions configured to support the first and second fork shafts,
at least one of the first and second boss portions is configured to restrict axial direction movement to a first or second boss portion side of the first or second shift fork accompanying axial direction movement of the first or second fork shaft.

15. The transmission according to claim 8, wherein the third fixing member is configured to be activated via the third shift fork due to the third fork shaft moving in the axial direction, and
the supporting member is configured to be capable of positioning an axial direction position of the third fork shaft such that the fixing of the third idler gear to the first shaft by the third fixing member is maintained, and configured to be capable of positioning an axial direction position of the third fork shaft such that the releasing of the third idler gear from the first shaft by the third fixing member is maintained.

16. The transmission according to claim 12, wherein the fourth fixing member is configured to be activated via the fourth shift fork due to the fourth fork shaft moving in the axial direction, and
the supporting member is configured to be capable of positioning an axial direction position of the fourth fork shaft such that the fixing of the fourth idler gear to the second shaft by the fourth fixing member is maintained, and configured to be capable of positioning an axial direction position of the fourth fork shaft such that the releasing of the fourth idler gear from the second shaft by the fourth fixing member is maintained.

17. The transmission according to claim 1, wherein the case member includes a housing to which the first shaft, the second shaft, and the support member are attached, and a case body capable of housing the gear module and the fork module, and a body attachment face of the housing to which the case body is attached and a supporting member attachment face of the housing to which the supporting member is attached are configured to be flush.

18. A method for assembling a transmission, the transmission comprising a case member, a gear module, and a fork module, the case member includes
   a housing configured such that the gear module and the fork module are attachable thereto, and
   a case main body configured to be capable of housing the gear module and the fork module, the gear module includes
   a first shaft supported by the case member,
   a second shaft supported by the case member so as to be parallel with the first shaft,
   a first idler gear supported by the first shaft so as to be relatively rotatable with respect to the first shaft,
   a first fixed gear fixed to the second shaft so as to engage with the first idler gear,
   a second idler gear supported by the second shaft so as to be relatively rotatable with respect to the second shaft,
   a second fixed gear fixed to the first shaft so as to engage with the second idler gear,
   a first fixing member disposed on the first shaft and configured to fix the first idler gear to the first shaft and release the first idler gear from the first shaft, and
   a second fixing member disposed on the second shaft and configured to fix the second idler gear to the second shaft and release the second idler gear from the second shaft, and the fork module includes
   a first shift fork configured to engage the first fixing member,
   a first fork shaft supporting the first shift fork,
   a second shift fork configured to engage the second fixing member,
   a second fork shaft supporting the second shift fork, and
   a supporting member supporting the first fork shaft and the second fork shaft so as to be movable in an axial direction, the method comprising:
   assembling the gear module to the housing;
   assembling the fork module to the housing, to which the gear module has been assembled, by guiding the fork module such that the engaging of the second shift fork with the second fixing member is started after the engaging of the first shift fork with the first fixing member has been started; and
   assembling the case main body to the housing to which the gear module and the fork module have been assembled.

19. The method for assembling a transmission according to claim 18, wherein assembling the fork module to the housing includes guiding the fork module such that the second shift fork engages the second fixing member after guiding the fork module such that the first shift fork engages the first fixing member.

* * * * *